US009552615B2

(12) United States Patent
Mathura et al.

(10) Patent No.: US 9,552,615 B2
(45) Date of Patent: Jan. 24, 2017

(54) AUTOMATED DATABASE ANALYSIS TO DETECT MALFEASANCE

(71) Applicant: Palantir Technologies Inc., Palo Alto, CA (US)

(72) Inventors: Shivam Mathura, New York, NY (US); Lucas Lemanowicz, New York, NY (US); Tim Vergenz, Jacksonville, FL (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 14/639,606

(22) Filed: Mar. 5, 2015

(65) Prior Publication Data

US 2016/0048937 A1 Feb. 18, 2016

Related U.S. Application Data

(60) Provisional application No. 62/036,519, filed on Aug. 12, 2014.

(51) Int. Cl.
*G06Q 20/40* (2012.01)
*G06Q 40/00* (2012.01)
(Continued)

(52) U.S. Cl.
CPC ............. *G06Q 50/26* (2013.01); *G06F 21/554* (2013.01); *G06Q 40/00* (2013.01); *G06Q 40/12* (2013.12);
(Continued)

(58) Field of Classification Search
None
See application file for complete search history.

(56) References Cited

U.S. PATENT DOCUMENTS 5,109,399 A 4/1992 Thompson
5,329,108 A 7/1994 Lamoure
(Continued)

FOREIGN PATENT DOCUMENTS

DE 102014103482 9/2014
DE 102014215621 2/2015
(Continued)

OTHER PUBLICATIONS

US 8,712,906, 04/2014, Sprague et al. (withdrawn)
(Continued)

*Primary Examiner* — Allen Chein
(74) *Attorney, Agent, or Firm* — Knobbe, Martens, Olson & Bear, LLP

(57) ABSTRACT

In various embodiments, systems, methods, and techniques are disclosed for analyzing various entity data items including users, computing devices, and IP addresses, to detect malfeasance. The data and/or database items may be automatically analyzed to detect malfeasance, such as criminal activity to disguise the origins of illegal activities. Various money laundering indicators or rules may be applied to the entity data items to determine a likelihood that money laundering is occurring. Further, the system may determine one or more scores (and/or metascores) for each entity data item that may be indicative of a likelihood that it is involved in money laundering. Scores/metascores may be determined based on, for example, various money laundering scoring criteria and/or strategies. Account entities may be ranked based on their associated scores/metascores. Various embodiments may enable an analyst to discover various insights related to money laundering.

20 Claims, 11 Drawing Sheets

(51) Int. Cl.
*G06Q 50/26* (2012.01)
*G06F 21/55* (2013.01)
*H04L 29/06* (2006.01)

(52) U.S. Cl.
CPC ... *H04L 63/1425* (2013.01); *G06F 2221/2101* (2013.01); *G06Q 20/4014* (2013.01); *G06Q 20/4016* (2013.01)

(56) References Cited

U.S. PATENT DOCUMENTS

| | | |
|---|---|---|
| 5,632,987 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 6,057,757 A | 5/2000 | Arrowsmith et al. |
| 6,091,956 A | 7/2000 | Hollenberg |
| 6,161,098 A | 12/2000 | Wallman |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,456,997 B1 | 9/2002 | Shukla |
| 6,549,944 B1 | 4/2003 | Weinberg et al. |
| 6,560,620 B1 | 5/2003 | Ching |
| 6,567,936 B1 | 5/2003 | Yang et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,714,936 B1 | 3/2004 | Nevin, III |
| 6,775,675 B1 | 8/2004 | Nwabueze et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,373,669 B2 | 5/2008 | Eisen |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,451,397 B2 | 11/2008 | Weber et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,783,658 B1 | 8/2010 | Bayliss |
| 7,805,457 B1 | 9/2010 | Viola et al. |
| 7,809,703 B2 | 10/2010 | Balabhadrapatruni et al. |
| 7,814,102 B2 | 10/2010 | Miller |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,046,362 B2 | 10/2011 | Bayliss |
| 8,103,543 B1 | 1/2012 | Zwicky |
| 8,134,457 B2 | 3/2012 | Velipasalar et al. |
| 8,135,679 B2 | 3/2012 | Bayliss |
| 8,135,719 B2 | 3/2012 | Bayliss |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,266,168 B2 | 9/2012 | Bayliss |
| 8,271,461 B2 | 9/2012 | Pike et al. |
| 8,280,880 B1 | 10/2012 | Aymeloglu et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,321,943 B1 | 11/2012 | Walters et al. |
| 8,347,398 B1 | 1/2013 | Weber |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,674 B2 | 5/2013 | Choudhuri et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,484,168 B2 | 7/2013 | Bayliss |
| 8,489,331 B2 | 7/2013 | Kopf et al. |
| 8,489,641 B1 | 7/2013 | Seefeld et al. |
| 8,495,077 B2 | 7/2013 | Bayliss |
| 8,498,969 B2 | 7/2013 | Bayliss |
| 8,498,984 B1 | 7/2013 | Hwang et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,709 B2 | 10/2013 | Goodson et al. |
| 8,560,413 B1 * | 10/2013 | Quarterman ........ H04L 63/1483 705/35 |
| 8,577,911 B1 | 11/2013 | Stepinski et al. |
| 8,589,273 B2 | 11/2013 | Creeden et al. |
| 8,600,872 B1 | 12/2013 | Yan |
| 8,620,641 B2 | 12/2013 | Farnsworth et al. |
| 8,646,080 B2 | 2/2014 | Williamson et al. |
| 8,639,757 B1 | 3/2014 | Adams et al. |

(56) References Cited

U.S. PATENT DOCUMENTS

| | | |
|---|---|---|
| 8,676,857 B1 | 3/2014 | Adams et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,799 B1 | 8/2014 | Cervelli et al. |
| 8,812,960 B1 | 8/2014 | Sun et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0174201 A1 | 11/2002 | Ramer et al. |
| 2002/0194119 A1* | 12/2002 | Wright et al. .................. 705/38 |
| 2003/0028560 A1 | 2/2003 | Kudrolli et al. |
| 2003/0039948 A1 | 2/2003 | Donahue |
| 2003/0097330 A1 | 5/2003 | Hillmer et al. |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | Gorman |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0260702 A1 | 12/2004 | Cragun et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0080769 A1 | 4/2005 | Gemmell |
| 2005/0086207 A1 | 4/2005 | Heuer et al. |
| 2005/0108063 A1 | 5/2005 | Madill et al. |
| 2005/0125715 A1 | 6/2005 | Franco et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0222928 A1 | 10/2005 | Steier et al. |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0150369 A1 | 6/2007 | Zivin |
| 2007/0174760 A1 | 7/2007 | Chamberlain et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0240062 A1 | 10/2007 | Christena et al. |
| 2007/0266336 A1 | 11/2007 | Nojima et al. |
| 2007/0294200 A1 | 12/2007 | Au |
| 2007/0294643 A1 | 12/2007 | Kyle |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0104019 A1 | 5/2008 | Nath |
| 2008/0126951 A1 | 5/2008 | Sood et al. |
| 2008/0133567 A1 | 6/2008 | Ames et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288425 A1 | 11/2008 | Posse et al. |
| 2008/0301643 A1 | 12/2008 | Appleton et al. |
| 2009/0002492 A1 | 1/2009 | Velipasalar et al. |
| 2009/0018940 A1 | 1/2009 | Wang et al. |
| 2009/0027418 A1 | 1/2009 | Maru et al. |
| 2009/0030915 A1 | 1/2009 | Winter et al. |
| 2009/0044279 A1 | 2/2009 | Crawford et al. |
| 2009/0055251 A1 | 2/2009 | Shah et al. |
| 2009/0082997 A1 | 3/2009 | Tokman et al. |
| 2009/0083184 A1 | 3/2009 | Eisen |
| 2009/0088964 A1 | 4/2009 | Schaaf et al. |
| 2009/0119309 A1 | 5/2009 | Gibson et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0192957 A1 | 7/2009 | Subramanian et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0300589 A1* | 12/2009 | Watters .................. G06Q 40/00 717/140 |
| 2010/0011282 A1 | 1/2010 | Dollard et al. |
| 2010/0042922 A1 | 2/2010 | Bradateanu et al. |

(56) References Cited

U.S. PATENT DOCUMENTS

| | | |
|---|---|---|
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0077483 A1 | 3/2010 | Stolfo et al. |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0162176 A1 | 6/2010 | Dunton |
| 2010/0169237 A1 | 7/2010 | Howard et al. |
| 2010/0185691 A1 | 7/2010 | Irmak et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0087519 A1 | 4/2011 | Fordyce, III et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0167493 A1 | 7/2011 | Song et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0178842 A1 | 7/2011 | Rane et al. |
| 2011/0185316 A1 | 7/2011 | Reid et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0231223 A1 | 9/2011 | Winters |
| 2011/0238510 A1 | 9/2011 | Rowen et al. |
| 2011/0238553 A1* | 9/2011 | Raj et al. ................ 705/37 |
| 2011/0238570 A1 | 9/2011 | Li et al. |
| 2011/0258158 A1 | 10/2011 | Resende et al. |
| 2011/0270705 A1 | 11/2011 | Parker |
| 2011/0289397 A1 | 11/2011 | Eastmond et al. |
| 2011/0291851 A1 | 12/2011 | Whisenant |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084135 A1 | 4/2012 | Nissan et al. |
| 2012/0084866 A1 | 4/2012 | Stolfo |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0208636 A1 | 8/2012 | Feige |
| 2012/0215898 A1 | 8/2012 | Shah et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0290879 A1 | 11/2012 | Shibuya et al. |
| 2012/0296907 A1 | 11/2012 | Long et al. |
| 2012/0310838 A1 | 12/2012 | Harris et al. |
| 2012/0311684 A1* | 12/2012 | Paulsen et al. ................ 726/6 |
| 2012/0323888 A1 | 12/2012 | Osann, Jr. |
| 2012/0330973 A1 | 12/2012 | Ghuneim et al. |
| 2013/0006725 A1 | 1/2013 | Simanek et al. |
| 2013/0018796 A1* | 1/2013 | Kolhatkar et al. ............... 705/44 |
| 2013/0024307 A1 | 1/2013 | Fuerstenberg et al. |
| 2013/0024339 A1 | 1/2013 | Choudhuri et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0097482 A1 | 4/2013 | Marantz et al. |
| 2013/0101159 A1 | 4/2013 | Chao et al. |
| 2013/0110822 A1 | 5/2013 | Ikeda et al. |
| 2013/0111320 A1 | 5/2013 | Campbell et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0157234 A1 | 6/2013 | Gulli et al. |
| 2013/0160120 A1 | 6/2013 | Malaviya et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0211985 A1 | 8/2013 | Clark et al. |
| 2013/0224696 A1 | 8/2013 | Wolfe et al. |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0311375 A1 | 11/2013 | Priebatsch |
| 2013/0318594 A1 | 11/2013 | Hoy et al. |
| 2013/0339218 A1 | 12/2013 | Subramanian et al. |
| 2014/0006109 A1 | 1/2014 | Callioni et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0059038 A1 | 2/2014 | McPherson et al. |
| 2014/0068487 A1 | 3/2014 | Steiger et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0149272 A1 | 5/2014 | Hirani et al. |
| 2014/0149436 A1 | 5/2014 | Bahrami et al. |

(56) References Cited

U.S. PATENT DOCUMENTS

| | | | |
|---|---|---|---|
| 2014/0156484 A1* | 6/2014 | Chan | G06Q 20/04 705/35 |
| 2014/0156527 A1 | 6/2014 | Grigg et al. | |
| 2014/0157172 A1 | 6/2014 | Peery et al. | |
| 2014/0164502 A1 | 6/2014 | Khodorenko et al. | |
| 2014/0189536 A1 | 7/2014 | Lange et al. | |
| 2014/0195515 A1 | 7/2014 | Baker et al. | |
| 2014/0195887 A1 | 7/2014 | Ellis et al. | |
| 2014/0267294 A1 | 9/2014 | Ma | |
| 2014/0267295 A1 | 9/2014 | Sharma | |
| 2014/0279824 A1 | 9/2014 | Tamayo | |
| 2014/0310282 A1 | 10/2014 | Sprague et al. | |
| 2014/0316911 A1 | 10/2014 | Gross | |
| 2014/0333651 A1 | 11/2014 | Cervelli et al. | |
| 2014/0337772 A1 | 11/2014 | Cervelli et al. | |
| 2015/0019394 A1 | 1/2015 | Unser et al. | |
| 2015/0046870 A1 | 2/2015 | Goldenberg et al. | |
| 2015/0089424 A1 | 3/2015 | Duffield et al. | |
| 2015/0100897 A1 | 4/2015 | Sun et al. | |
| 2015/0100907 A1 | 4/2015 | Erenrich et al. | |

FOREIGN PATENT DOCUMENTS

| | | |
|---|---|---|
| EP | 1191463 | 3/2002 |
| EP | 1672527 | 6/2006 |
| EP | 2551799 | 1/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2891992 | 7/2015 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/09529 | 2/2000 |
| WO | WO 2005/104736 | 11/2005 |
| WO | WO 2008/011728 | 1/2008 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |
| WO | WO 2013/126281 | 8/2013 |

OTHER PUBLICATIONS

"a-word-about-banks-and-the-laundering-of-drug-money", Aug. 18, 2012, available at http://www.golemxiv.co.uk/2012/08/a-word-about-banks-and-the-laundering-of-drug-money/.*
"Potential Money Laundering Warning Signs", snapshot taken 2003, available at https://web.archive.org/web/20030816090055/http://finsolinc.com/anti-money%20laundering%20training%20%guides.pdf.*
"Using Whois Based Geolocation and Google Maps API for support cybercrime investigations", http://wseas.us/e-library/conferences/2013/Dubrovnik/TELECIRC/TELECIRC-32.pdf.*
"Money Laundering Risks and E-Gaming: A European Overview and Assessment", 2009, http://www.cf.ac.uk/socsi/resources/Levi_Final_Money_Laundering_Risks_egaming.pdf.*
"A First Look: Predicting Market Demand for Food Retail using a Huff Analysis," TRF Policy Solutions, Jul. 2012, pp. 30.
"A Quick Guide to UniProtKB Swiss-Prot & TrEMBL," Sep. 2011, pp. 2.
Acklen, Laura, "Absolute Beginner's Guide to Microsoft Word 2003," Dec. 24, 2003, pp. 15-18, 34-41, 308-316.
Alfred, Rayner "Summarizing Relational Data Using Semi-Supervised Genetic Algorithm-Based Clustering Techniques", Journal of Computer Science, 2010, vol. 6, No. 7, pp. 775-784.
Amnet, "5 Great Tools for Visualizing Your Twitter Followers," posted Aug. 4, 2010, http://www.amnentblog.com/component/content/article/115-5-grate-tools-for-visualizing-your-twitter-followers.html.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilia.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117l#resizing-amp-overflow retrieved on May 18, 2015.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Conner, Nancy, "Google Apps: The Missing Manual," May 1, 2008, pp. 15.
Definition "Identify" downloaded Jan. 22, 2015, 1 page.
Definition "Overlay" downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
GIS-NET 3 Public—Department of Regional Planning. Planning & Zoning Information for Unincorporated LA County. Retrieved Oct. 2, 2013 from http://gis.planning.lacounty.gov/GIS-NET3_Public Viewer.html.
Goswami, Gautam, "Quite Writly Said!" One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al. "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: Its Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: an open RDF infrastructure for shared Web annotations", Computer Networks 39, pp. 589-608, 2002.

(56) References Cited

OTHER PUBLICATIONS

Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http/keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents," 2002, 6 pages.
Olanoff, Drew, "Deep Dive with the New Google Maps for Desktop with Google Earth Integration, Its More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Palmas et al., "An Edge-Bunding Layout for Interactive Parallel Coordinates" 2014 IEEE Pacific Visualization Symposium, pp. 57-64.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Rouse, Margaret, "OLAP Cube," http://searchdatamanagement.techtarget.com/definition/OLAP-cube, Apr. 28, 2012, pp. 16.
Shah, Chintan, "Periodic Connections to Control Server Offer New Way to Detect Botnets," Oct. 24, 2013 in 6 pages, http://www.blogs.mcafee.com/mcafee-labs/periodic-links-to-control-server-offer-new-way-to-detect-botnets.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
Umagandhi et al., "Search Query Recommendations Using Hybrid User Profile with Query Logs," International Journal of Computer Applications, vol. 80, No. 10, Oct. 1, 2013, pp. 7-18.
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.
Wikipedia, "Federated Database System," Sep. 7, 2013, retrieved from the internet on Jan. 27, 2015 http://enwikipedia.org/w/index.php?title=Federated_database_system&oldid=571954221.
Yang et al., "HTML Page Analysis Based on Visual Cues," 2001, pp. 859-864.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/139,713 dated Jun. 12, 2015.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/264,445 dated May 14, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/616,080 dated Apr. 2, 2015.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14159535.5 dated May 22, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14186225.0 dated Feb. 13, 2015.
Official Communication for European Patent Application No. 14187996.5 dated Feb. 13, 2015.
Official Communication for European Patent Application No. 14189344.6 dated Feb. 20, 2015.
Official Communication for European Patent Application No. 14189347.9 dated Mar. 4, 2015.

(56) References Cited

OTHER PUBLICATIONS

Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14199182.8 dated Mar. 13, 2015.
Official Communication for Great Britain Patent Application No. 1404457.2 dated Aug. 14, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2013306 dated Apr. 24, 2015.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 13/247,987 dated Apr. 2, 2015.
Official Communication for U.S. Appl. No. 13/831,791 dated Mar. 4, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/225,006 dated Sep. 10, 2014.
Official Communication for U.S. Appl. No. 14/225,006 dated Feb. 27, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/264,445 dated Apr. 17, 2015.
Official Communication for U.S. Appl. No. 14/268,964 dated Sep. 3, 2014.
Official Communication for U.S. Appl. No. 14/278,963 dated Jan. 30, 2015.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated May 26, 2015.
Official Communication for U.S. Appl. No. 14/306,147 dated Feb. 19, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Sep. 9, 2014.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Mar. 31, 2015.
Official Communication for U.S. Appl. No. 14/473,552 dated Feb. 24, 2015.
Official Communication for U.S. Appl. No. 14/486,991 dated Mar. 10, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/518,757 dated Apr. 2, 2015.
Official Communication for U.S. Appl. No. 14/579,752 dated May 26, 2015.
U.S. Appl. No. 14/139,628, Tax Data Clustering, filed Dec. 23, 2013.
U.S. Appl. 14/139,713, User-Agent Data Clustering, filed Dec. 23, 2013.
U.S. Appl. No. 14/139,640, Trend Data Clustering, filed Dec. 23, 2013.
U.S. Appl. No. 14/278,963, Clustering Data Based on Indications of Financial Malfeasance, filed May 15, 2014.
U.S. Appl. No. 14/473,552, Data Item Clustering and Analysis, filed Aug. 29, 2014.
U.S. Appl. No. 14/473,920, External Malware Data Item Clustering and Analysis, filed Aug. 29, 2014.
U.S. App. No. 14/486,991, Internal Malware Data Item Clustering and Analysis, filed Sep. 15, 2014.

(56) References Cited

OTHER PUBLICATIONS

U.S. Appl. No. 14/487,021, Network Intrusion Data Item Clustering and Analysis, filed Sep. 15, 2014.
U.S. Appl. No. 14/698,432, Malicious Software Detection in a Computing System, filed Apr. 28, 2015.
U.S. Appl. No. 14/579,752, Systems and User Interfaces for Dynamic and Interactive Investigation of Bad Actor Behavior Based on Automatic Clustering of Related Data in Various Data Structures, filed Dec. 22, 2014.

* cited by examiner

Examples of Money Laundering Indicators

| |
|---|
| Access to a financial account from a physical location associated with drug trafficking, or from locations indicating a known pattern of drug trafficking (e.g. Columbia, then Mexico, then United States). |
| A device's fingerprint is known to be on a "bad fingerprint" list, IP address on a "bad IP address" list, or a user is known to be on a known money laundering user list. |
| A device or IP address logs into an account already known to be affiliated with money laundering, or a user logs into an account with a device or IP address already know to be affiliated with money laundering. |
| A user, IP address, or device accessing the financial account has a history of previous money laundering investigations. |
| A user, IP address, or device is involved in a transaction matching money laundering criteria (e.g., threshold value of a transaction, conversion to specific currency, etc.). |
| Accounts in which a particular dollar amount (or at least a particular dollar amount) is sent from a credit line to a credit union, or is a part of any financial transfer. |
| IP address or device used to access financial account is from a known high-risk area for money laundering. |
| Financial account is accessed from multiple physical locations within an unreasonable time period for travelling between physical locations. |
| A single device accesses multiple financial accounts from distinct physical locations from within a threshold time period. |
| A device accesses a financial account during a particular high risk time period for money laundering. |
| A device, user, or IP address exceeds a threshold number of failures at initiating a financial transaction for a financial account. |
| A device's configuration change matches a pattern for money laundering, such as whether a device's clock time frequently changes between a Russian time zone and a US time zone, or the device's geolocation as determined by GPS does not match the device's IP address based geolocation. |
| The date and times of a device, user, or IP address's access of a financial account matches a timing pattern indicating money laundering. |
| Multiple transactions of a user, device, or IP, indicates a charge for money laundering services. |
| A user accessing financial account is affiliated with a user watch list. |
| A device or IP address accesses financial accounts away from expected locations. |
| User accesses financial accounts away from known address of user. |
| Device accessing financial account is known to be in a different location than user affiliated with device or financial account. |

FIG. 3B

AUTOMATED DATABASE ANALYSIS TO DETECT MALFEASANCE

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application claims priority benefit under 35 U.S.C. §119(e) of U.S. Provisional Patent Application No. 62/036,519, filed Aug. 12, 2014, which is hereby incorporated by reference in its entirety and for all purposes.

This application is related to but does not claim priority from U.S. Provisional Patent Application No. 61/919,653, filed Dec. 20, 2013, U.S. Provisional Patent Application No. 61/952,032, filed Mar. 12, 2014, and U.S. patent application Ser. No. 14/251,485, filed Apr. 11, 2014. Each of these applications are hereby incorporated by reference herein in their entireties and for all purposes.

BACKGROUND

Embodiments of the present disclosure generally relate to data analysis and, more specifically, to detecting and scoring potential money laundering activities.

In financial and security investigations an analyst may have to make decisions regarding data items (e.g., individual pieces of information) within a collection of data. For instance, the analyst may have to decide whether an entity data item represents an entity involved in money laundering. However, an individual entity data item, such as a lone device, financial account, or IP address, oftentimes includes insufficient information for the analyst to make such decisions.

SUMMARY

The systems, methods, and devices described herein each have several aspects, no single one of which is solely responsible for its desirable attributes. Without limiting the scope of this disclosure, several non-limiting features will now be discussed briefly.

In the example noted above, the analyst may make better decisions based upon a collection of related data items. For instance, a computing device may be related to two financial accounts because the same device accesses both accounts. Various systems, such as those disclosed in the following patent applications, may assist the analyst in identifying data items that are directly related to an initial data item.

| Ser. No. | Title | Filed |
|---|---|---|
| 61/800,887 | GENERATING PRIORITIZED DATA CLUSTERS WITH CUSTOMIZABLE ANALYSIS STRATEGIES | Mar. 15, 2013 |
| 13/968,265 | GENERATING DATA CLUSTERS WITH CUSTOMIZABLE ANALYSIS STRATEGIES | Aug. 15, 2013 |
| 13/968,213 | PRIORITIZING DATA CLUSTERS WITH CUSTOMIZABLE SCORING STRATEGIES | Aug. 15, 2013 |
| 14/139,628 | TAX DATA CLUSTERING | Dec. 23, 2013 |
| 14/139,603 | MALWARE DATA CLUSTERING | Dec. 23, 2013 |
| 14/139,713 | USER-AGENT DATA CLUSTERING | Dec. 23, 2013 |
| 14/139,640 | TREND DATA CLUSTERING | Dec. 23, 2013 |
| 61/919,653 | ACCOUNT DATA CLUSTERING | Dec. 20, 2013 |
| 61/952,032 | FRAUD DETECTION AND SCORING | Mar. 12, 2014 |
| 14/251,485 | FRAUD DETECTION AND SCORING | Apr. 11, 2014 |

The disclosures of each of the above-noted applications are hereby incorporated by reference herein in their entireties and for all purposes.

For example, the analyst could initiate an investigation with a single suspicious entity, such as a computing device that has been known to access financial accounts involved in money laundering. If the analyst examined this data item by itself, then the analyst may not observe any suspicious characteristics. However, the analyst may request a list of data items related to the initial data item by a shared attribute, such as financial accounts that have also been accessed by the computing device. In doing so, the analyst may discover an additional data item, such as a money transfer transaction between an accessed financial account and an additional financial account. The analyst may then mark the additional financial account as potentially involved in money laundering, based upon the additional data items located through relation to the computing device.

Although these systems can be very helpful in discovering related data items, they typically require the analyst to manually repeat the same series of searches for many investigations. Repeating the same investigation process consumes time and resources, such that there are oftentimes more investigations than can be performed. Thus, analysts typically prioritize investigations based upon the characteristics of the entities (e.g. IP address entities, computing device entities (with Device ID, device fingerprint etc. characteristics), financial account entities, and financial account user entities (with user ID, password, PIN, financial account number, etc. characteristics). However, there may be insignificant differences between the entities, so the analyst may not be able to determine the correct priority for investigations. For instance, the analyst may need to choose between two potential investigations based upon separate IP addresses potentially involved in money laundering. One investigation could reveal more likely money laundering activity than the other, and therefore may be more important to pursue. Yet, the characteristics of the two original entities could be similar, so the analyst may not be able to choose the more important investigation based on characteristics of the two original entities alone. Accordingly, without more information, prioritizing investigations may be difficult and error prone.

According to various embodiments, a data analysis system ("the system") is disclosed that may automatically detect, based on various entities (e.g. IP addresses, computing devices, financial accounts and/or their users) and their characteristics (e.g., relationships, properties etc.), a likelihood of money laundering and/or malfeasance. For example, the data analysis system analyzing a specific entity (e.g. mobile device) may be used in conjunction with an entity's characteristics (e.g. device ID, time of access to a financial account website by that device ID, geolocation the access occurred from, etc.) to detect likely money laundering activity and/or malfeasance by that entity. Money laundering activity may include, for example, concealment of the origins of illegally obtained money, typically by means of transfers involving foreign banks or legitimate businesses. For example, a money laundering activity may include a user, logging on to a bank's website via a computing device having a specific IP address, to transfer illegal money between a foreign financial account and a US financial account.

In another example, money laundering activity may be more complex. For example, money laundering activity may involve transfer of money along a known drug trade route. In one such scenario, money moving between a bank located in any of Colombia, Venezuela, or Argentina, and then to a bank in any of Mexico, Ecuador, or the Bahamas, and then onto a bank in the United States, may constitute potential money laundering activity. As another example, if there was access to financial accounts from a device or IP address from various physical locations (e.g. a device or IP address being physical located during access to a financial account along the same route—located in any of Colombia, Venezuela, or Argentina, and then located in any of Mexico, Ecuador, or the Bahamas, and then located in the United States), then this activity may constitute potential money laundering activity.

Financial institutions, such as banks, may desire efficient ways to identify such money laundering activities to reduce and/or combat the legitimization of illegal money. Further Financial institutions may be under obligations to comply with regulatory requirements and/or be under scrutiny from governments to prevent or detect such activities. Those entities that exhibit money laundering behaviors and/or may have particular characteristics or patterns of characteristics or activity may be identified by the system.

In various embodiments, the system may comprise one or more computer readable storage devices configured to store one or more software modules including computer executable instructions; a plurality of entity data items; a plurality of entity activity data items, the entity activity data items each associated with one or more respective financial accounts and associated with at least one entity data item of the plurality of entity data items; a plurality of money laundering indicators; and a plurality of money laundering scoring criteria. The system may further comprise one or more hardware computer processors in communication with the one or more computer readable storage devices and configured to execute the computer executable instructions of the one or more software modules in order to cause the computer system to access, from the one or more computer readable storage devices, the plurality of entity data items and the plurality of the entity activity data items. The system may further, for each of the plurality of entity data items, compare the plurality of money laundering indicators to the plurality of entity activity data items associated with the entity data item to determine whether the entity data item satisfies one or more of the money laundering indicators. For each of the determined entity data items satisfying one or more money laundering indicators, the system may determine raw score values for each of the satisfied money laundering indicators associated with the determined entity data item; and based on at least one of the plurality of money laundering scoring criteria, determine a score for the determined entity data item based at least on the determined raw score values of the satisfied money laundering indicators and a quantity of satisfied money laundering indicators, wherein the determined score is indicative of a likelihood that the determined entity data item is associated with money laundering.

In some embodiments, an entity uniquely associated with each entity data item of the plurality of entity data items comprises a user of a financial account, a device, or an IP address. In some embodiments, the plurality of entity activity data items are generated based on web log data. In various embodiments, at least one money laundering indicator of the plurality of money laundering indicators comprises one or more rules configured to determine whether a first entity, uniquely associated with a first entity data item in the plurality of entity data items, accessed a financial account from one or more locations associated with illegal activity. In some embodiments, the one or more locations associated with illegal activity comprises a plurality of distinct locations, and the at least one money laundering indicator requires that the first entity, uniquely associated with the first entity data item, accessed the financial account from at least two distinct locations in the plurality of distinct locations. Similarly, in some embodiments, the at least one money laundering indicator requires that the first entity accessed the financial account from at least three distinct locations in the plurality of distinct locations in a specific order or pattern. In certain embodiments, the specific order or pattern comprises a timing requirement for the first entity accessing the financial account from the at least two distinct locations in the plurality of distinct locations. In some embodiments, the at least one money laundering scoring criteria is configured to determine a score for an entity based on whether the first entity accessed the financial account from locations that are within a threshold range of a registered address associated with the entity.

In some embodiments, a computer-implemented method may comprise, under control of one or more hardware computing devices configured with specific computer executable instructions, enabling communication with one or more computer readable storage devices configured to store: one or more software modules including computer executable instructions; a plurality of entity data items; a plurality of entity activity data items, the entity activity data items each associated with one or more respective financial accounts and associated with at least one entity data item in the plurality of entity data items; a plurality of money laundering indicators; and a plurality of money laundering scoring criteria. The computer-implemented method may further comprise accessing, from the one or more computer readable storage devices, the plurality of entity data items and the plurality of the entity activity data items. The computer-implemented method may further comprise, for each of the plurality of entity data items, comparing the plurality of money laundering indicators to the plurality of entity activity data items associated with the entity data item to determine whether the entity data item satisfies one or more of the money laundering indicators; and for each of the determined entity data items satisfying one or more money laundering indicators: determining raw score values for each of the satisfied money laundering indicators associated with the determined entity data item; and based on at least one of the plurality of money laundering scoring criteria, determine a score for the determined entity data item based at least on a quantity of satisfied money laundering indicators.

In some computer-implemented method embodiments, the entity uniquely associated with each entity data item of the plurality of entity data items comprises a user of a financial account, a device, or an IP address. In some embodiments, a computer implemented method comprises generating the plurality of entity data items based on web log data. In some embodiments, at least one money laundering indicator of the plurality of money laundering indicators comprises one or more rules configured to determine whether a first entity, uniquely associated with a first entity data item in the plurality of entity data items, accessed a financial account from one or more locations associated with illegal activity. In some embodiments of the computer-implemented method, the one or more locations associated with illegal activity comprises a plurality of distinct locations, and the at least one money laundering indicator requires that the first entity, uniquely associated with the first entity data item, accessed the financial account from at least two distinct locations in the plurality of distinct locations. In some embodiments, the at least one money laundering indicator requires that the first entity accessed the financial account from at least three distinct locations in the plurality of distinct locations in a specific order or pattern. In various embodiments, the specific order or pattern comprises a timing requirement for the first entity accessing the financial account from the at least two distinct locations in the plurality of distinct locations. In certain embodiments, the at least one money laundering scoring criteria is configured to determine a score for an entity based on at least one access location of the financial account by the first entity.

In some embodiments, a non-transitory computer-readable storage medium storing computer-executable instructions that, when executed by a computer system, configure the computer system to perform operations comprising enabling communication with one or more computer readable storage devices configured to store one or more software modules including computer executable instructions; a plurality of entity data items; a plurality of entity activity data items, the entity activity data items each associated with one or more respective financial accounts and associated with at least one entity data item in the plurality of entity data items; a plurality of money laundering indicators; and a plurality of money laundering scoring criteria. The instructions may further configure the computer system to execute accessing, from the one or more computer readable storage devices, the plurality of entity data items and the plurality of the entity activity data items; for each of the plurality of entity data items, comparing the plurality of money laundering indicators to the plurality of entity activity data items associated with the entity data item to determine whether the entity data item satisfies one or more of the money laundering indicators; and for each of the determined entity data items satisfying one or more money laundering indicators: determining raw score values for each of the satisfied money laundering indicators associated with the determined entity data item; and based on at least one of the plurality of money laundering scoring criteria, determine a score for the determined entity data item.

In various embodiments, an entity uniquely associated with each entity data item of the plurality of entity data items comprises a user of a financial account, a device, or an IP address. In some embodiments, the operations further comprise generating the plurality of entity data items based on web log data. In various embodiments, the at least one money laundering indicator of the plurality of money laundering indicators comprises one or more rules configured to determine whether a first entity, uniquely associated with a first entity data item in the plurality of entity data items, accessed a financial account from one or more locations associated with illegal activity.

BRIEF DESCRIPTION OF THE DRAWINGS

So that the manner in which the above recited features of the present invention may be understood in detail, a more particular description of various embodiments, briefly summarized above, may be had by reference to the appended drawings and detailed description. It is to be noted, however, that the appended drawings illustrate only typical embodiments of present disclosure and are therefore not to be considered limiting of its scope, for present disclosure may admit to other equally effective embodiments.

FIG. 3B is a table listing example money laundering indicators, according to various embodiments of the present disclosure.

DETAILED DESCRIPTION OF SPECIFIC EMBODIMENTS

I. Terms

Figure 1A:
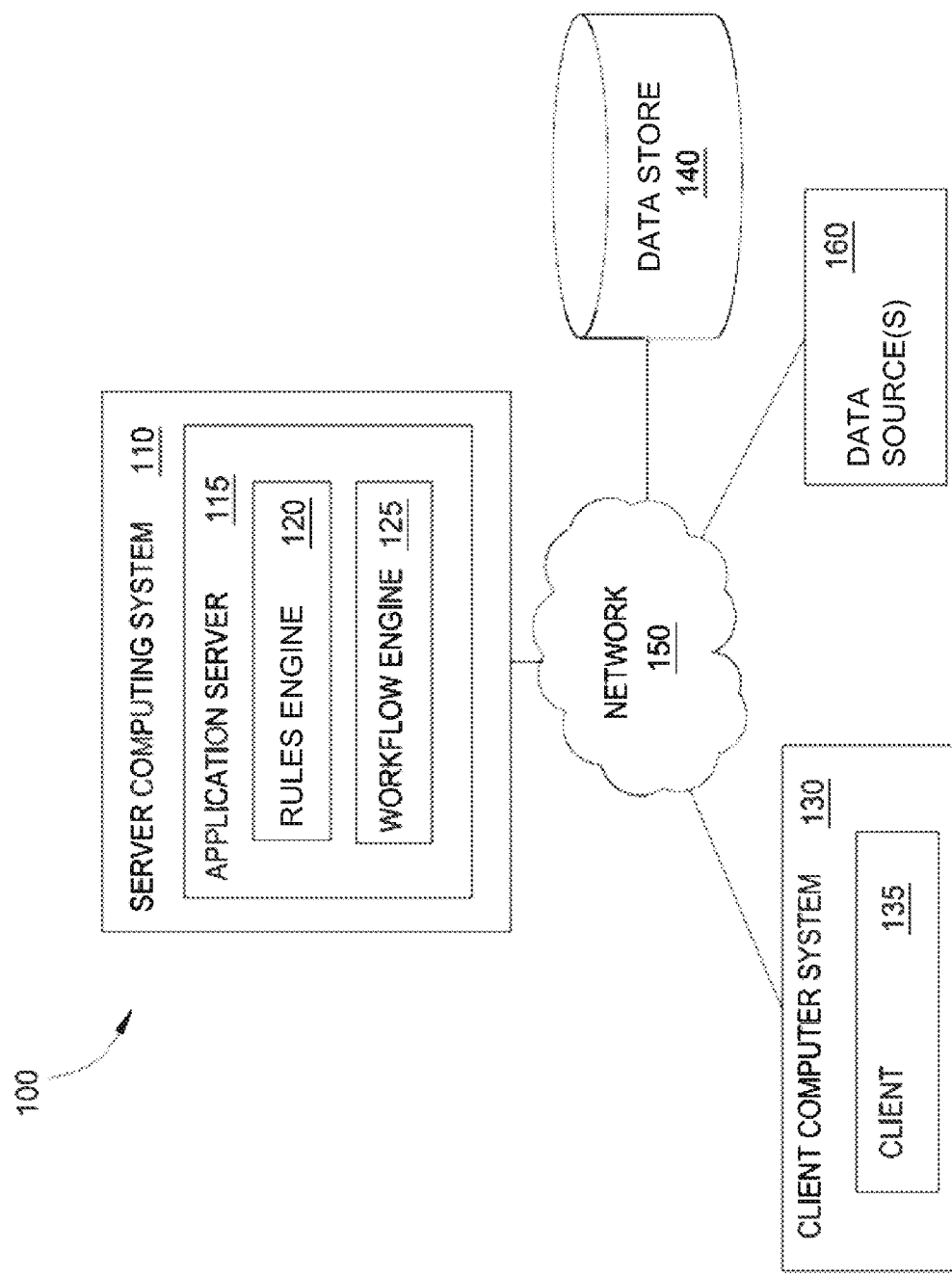
FIG. 1A is a block diagram illustrating an example data analysis system, according to an embodiment of the present disclosure.

In order to facilitate an understanding of the systems and methods discussed herein, a number of terms are defined below. Each of the terms defined below are broad terms and should be construed in accordance with the ordinary and customary meaning of the terms to a person of ordinary skill of art to which the systems and methods pertain, and should also be construed to include without limitation the descriptions provided below and other implicit meanings to a person of ordinary skill. Thus, neither the definitions below nor the examples, embodiments or illustrations contained herein should be considered limiting with respect to the meaning of these terms or the claims in which they may appear, and such examples, embodiments and illustrations should not be read into or be construed in the claims either by implication or any lack of multiple embodiments.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (for example, Oracle database, mySQL database, and the like), spreadsheets, XML files, binary files, and text files, among others. The various terms "database," "data store," and "data source" may be used interchangeably in the present disclosure.

Data Item (Item), Entity Data Item (Entity), or Data Object (Object): A data container for information representing specific things in the world that have a number of definable properties. For example, a data item may represent an entity such as a financial account (such as bank account, investment account, etc.), a financial account user, a transaction, a person, a place, an organization, a device (such as a server, desktop computer, smartphone or laptop), an activity, a market instrument, an IP address, or other noun. A data item may represent an event that happens at a point in time or for a duration in time. A data item may represent a document or other unstructured data source such as an e-mail message, a news report, or a written paper or article. Each data item may be associated with a unique identifier that uniquely identifies the data item. The data item's attributes (also called "characteristics", "properties" or "relationships") may include one or more values of a data item or metadata about the data item, such as a user's user ID or password or affiliated financial account number, a computing device's device ID, fingerprint, etc., or an IP address's associated physical location. A "user" may be considered an individual financial account user, or a company, organization, or other legal entity. The terms "data item," "data object," "data entity," and "entity data item," may be used interchangeably and/or synonymously in the present disclosure. References to an "entity" in a data or computer system context may refer to an entity data item.

Item (or Object or Entity) Type: Type of a data item. Example data item types may include Account, Device, IP Address, Transaction, Person, Event, or Document. Data item types may be defined by an ontology and may be modified or updated to include additional data item types. A data item definition (for example, in an ontology) may include how the data item is related to other data items, such as being a sub-data item type of another data item type (for example, an agent may be a sub-data item of a person data item type), and the properties the data item type may have.

Entity Activity Data Items: A data item corresponding to an event associated with an entity. Example entity activity data items include data representing access to a financial account, the action taken on a financial account (e.g., determining balance, transferring money to or from the financial account, making a trade, etc.). Entity activity data items may also include entity information (using a property or relationship), such as a device or IP address that has accessed a financial account during a specific event. In some embodiments, some or all entity activity data items may be implemented as properties of entity data items or as links to and/or from entity data items.

Properties: Attributes of a data item and/or other information associated with a data item (also referred to as "characteristics", "attributes", "relationships", or "metadata"). At a minimum, each property of a data item has a property type and a value or values. Properties/metadata associated with data items may include any information relevant to that data item. For example, properties associated with an entity data item (e.g., a data item having an item type of "account") may include an account number, an associated customer identifier, an opening date, and/or the like. In another example, a person data item may include a name (for example, John Doe), an address (for example, 123 S. Orange Street), and/or a phone number (for example, 800-0000), among other properties. In another example, metadata associated with a computer or device entity data item may include a list of users (for example, user1, user 2, and the like), and/or an IP (internet protocol) address associated with the device at a specific point in time, a device identifier, a device fingerprint, data characteristics of the device (browsers installed or used, fonts installed, HTTP headers sent or received, etc.) among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Link: A connection between two data items, based on, for example, a relationship, an event, and/or matching properties. Links may be directional, such as one representing a payment from person A to B, or bidirectional.

Link Set: Set of multiple links that are shared between two or more data items.

Seed: One or more data items that may be used as a basis, or starting point, for generating a cluster. A seed may be generated, determined, and/or selected from one or more sets of data items according to a seed generation strategy. For example, seeds may be generated from data items accessed from various databases and data sources including, for example, databases maintained by financial institutions, government entities, private entities, public entities, and/or publicly available data sources, including web logs thereof. In various embodiments of the present disclosure, seed data items may include entities (such as a device, financial account, or IP address) satisfying a money laundering score threshold, as described below.

Cluster: A group or set of one or more related data items. A cluster may be generated, determined, and/or selected from one or more sets of data items according to a cluster generation strategy. A cluster may further be generated, determined, and/or selected based on a seed. For example, a seed may comprise an initial data item of a cluster. Data items related to the seed may be determined and associated with or added to the cluster. Further, additional data items related to any clustered data item may also be added to the cluster iteratively as indicated by a cluster generation strategy. Data items may be related by any common and/or similar properties, metadata, types, relationships, and/or the like.

Seed Generation Strategy and Cluster Generation Strategy: Seed and cluster generation strategies (which may comprise one or more "indicators" (also referred to as rules)) indicate processes, methods, and/or strategies for generating seeds and generating clusters, respectively. In various embodiments of the present disclosure, processes and methods of applying money laundering indicators to activity data to determine entities likely to be related to money laundering may be referred to as seed generation strategies. In an example, a seed generation strategy may indicate that entities having a particular property (for example, computing devices satisfying a money laundering score threshold), or entities that exhibit specific patterns of behavior across one or multiple data sources, are to be designated as seeds. In another example, a cluster generation strategy may indicate that data items having particular properties in common with (or similar to) a seed or other data item in a cluster are to be added to the cluster. Seed and/or cluster generation strategies may specify particular searches and/or rule matches to perform on one or more sets of data items. Execution of a seed and/or cluster generation strategy may produce layers of related data items. Additionally, a seed or cluster generation strategy may include multiple strategies, sub-strategies, rules, and/or sub-rules.

Cluster Scores: Values determined by various characteristics and/or attributes associated with the cluster and/or the various data items of the cluster.

Cluster Metascores: An overall cluster score. Cluster metascores may, for example, be based on a combination of cluster scores of a cluster associated with a seed.

II. Overview

As mentioned above, according to various embodiments, a data analysis system (the "system") is disclosed that may automatically detect, based on various entity activity data (e.g. account usage activity such as, activity logs of financial account users, computing devices, and IP addresses, among other entities accessing one or more financial accounts), a likelihood of malfeasance. The data and/or database items may be automatically analyzed to detect malfeasance, such as criminal activity to disguise the origins of illegal activities. For example, the data analysis system may be used in conjunction with financial user and device related data items to detect money laundering activity. Money laundering activity may include, for example, a person or group engaging in financial activity to illegally transfer money or disguise the source of money. Examples of money laundering may include transfers of money, or obfuscation of the source of money, so as to transform proceeds of illegal activity into ostensibly legitimate money or legitimate assets. Money laundering may also include any misuse of the financial system (usually performed via money transfer), including terrorism financing, tax evasion, international sanction evasion, import and/or export restrictions evasion, or other prohibited activities. Money laundering may include avoiding prohibitions that may include the source of a transfer (e.g. money from illegal crime activities such as extortion, insider trading, drug trafficking, illegal gambling, tax evasion etc.), or the destination of a transfer (e.g. money destined for a terrorist organization or to be imported to a specific country such as the US). Money laundering may also include the layering, integrating, or combining of illegal funds with legitimate funds, so as to conceal the source of funds. Money laundering may also include, in addition to money transfers, the purchase of assets that can conceal a source, such as securities, digital currencies (e.g. bitcoin), credit cards, cash, coupons, virtual currency, on-line game credits, etc.

Money Laundering may take many specific forms, including bank methods, smurfing (also known as structuring), currency exchanges, and double-invoicing. Each type of money laundering can be detected with appropriately crafted money laundering indicator(s) that can be crafted to detect financial account users, computing devices (mobile/non-mobile) and IP addresses associated with money laundering activity. Several example types of money laundering are listed below.

Cross Nation Access (also referred to as "Cross Nation Transfers"): Deposits into and/or from a bank or other financial account, where the deposits and withdrawals at least are partially sourced from a prohibited activity or entity, or destined for a prohibited activity or entity. Patterns of cross nation accesses may indicate such prohibited activities and indicate money laundering (e.g. a device accessing a financial account in locations according to a known pattern (such as a drug trade route), or specific money transfers between back accounts in different countries and/or jurisdictions according to a known money laundering route).

Structuring (also referred to as "smurfing"): a method of moving money whereby cash deposits are broken into smaller deposits of money, that are used to reduce suspicion of money laundering and to avoid anti-money laundering reporting requirements. A sub-component of this is to use smaller amounts of money to purchase bearer instruments, such as money orders, and then ultimately deposit those, again in small amounts.

Bulk cash smuggling: This involves smuggling money to another jurisdiction and depositing it in a financial institution, such as an offshore bank, with greater bank secrecy or less rigorous money laundering enforcement.

Cash-intensive businesses: In this method, a business typically involved in receiving cash uses its accounts to deposit both legitimate and criminally derived cash, claiming all of it as legitimate earnings. Service businesses are best suited to this method, as such businesses have no variable costs, and it is hard to detect discrepancies between revenues and costs.

Trade-based laundering: This involves under- or overvaluing invoices to disguise the movement of money.

Shell companies and trusts: Trusts and shell companies disguise the true owner of money. Trusts and corporate vehicles, depending on the jurisdiction, need not disclose their true, beneficial, owner.

Round-tripping: Money is deposited in a controlled foreign corporation offshore account, preferably in a tax haven where minimal records are kept, and then shipped back as a foreign direct investment, exempt from taxation. A variant on this is to transfer money to a law firm or similar organization as funds on account of fees, then to cancel the retainer and, when the money is remitted, represent the sums received from the lawyers as a legacy under a will or proceeds of litigation.

Bank capture: In this case, money launderers or criminals buy a controlling interest in a bank, preferably in a jurisdiction with weak money laundering controls, and then move money through the bank without scrutiny.

Casinos: In this method, an individual walks into a casino with cash and buys chips, plays for a while, and then cashes in the chips, taking payment in a check, or just getting a receipt, claiming it as gambling winnings. Alternatively, money can be spent on gambling, preferably on higher odds. The wins are shown if the source for money is asked for, while the losses are hidden.

Real estate: An entity purchases real estate with illegal proceeds and then sells the property. To outsiders, the proceeds from the sale look like legitimate income. Alternatively, the price of the property is manipulated, such as by the seller agreeing to a contract that underrepresents the value of the property and receiving criminal proceeds to make up the difference.

Black salaries: A company may have unregistered employees without a written contract and pay them cash salaries. Dirty money might be used to pay them.

Tax amnesties: For example, those that legalize unreported assets in tax havens and cash Fictional loans: A loan might be given to legitimately transfer money from a bank that has money to launder. The loan may or may not be defaulted on.

Anti-money laundering (AML) is a term mainly used in the financial and legal industries to describe the legal controls that require financial institutions and other regulated entities to prevent, detect, and report money laundering activities. Anti-money laundering guidelines came into prominence globally as a result of the formation of the Financial Action Task Force (FATF) and the promulgation of an international framework of anti-money laundering standards. The systems and methods described herein may, in an automatic fashion, or in a semi-automated fashion, assist analysts in detecting potential money laundering (or money laundering related anomalies) in order to satisfy an institution's AML obligations.

Such anomalies may include substantial increases in funds in a financial account, a large withdrawal, or moving money to a bank secrecy jurisdiction. They may also include detecting a transfer via an account user, device, or IP address on a black list, or involve a pattern of transactions having particular characteristics. Additional rules/indicators for detecting money laundering are described herein.

In various embodiments, as also mentioned above, the system may receive and/or access various data items relating to entity activity related data (e.g. financial account usage, user, or device activity) related to the transfer of money or securities. The entity activity related data may be associated with one or more bank or financial account data item and may, for example, include web log data (including a device, user, and/or IP address related to mobile device or web traffic activity with a financial institution), financial transaction data and/or various other user, device, or IP address based data.

The system may further receive and/or access various money laundering indicators or rules. Based on the money laundering indicators (which may also be referred to as rules) and the entity activity related data, the system may determine a likelihood that an entity data item is involved in money laundering, or associated with a money laundering operation. Further, the system may determine one or more scores (and/or metascores) for each entity data item that may be indicative of a likelihood an entity associated with the data item is involved in money laundering, or associated with money laundering. Scores and/or metascores may be determined based on, for example, various money laundering scoring criteria and/or strategies. As described in further detail below, entity data items may be ranked based on their associated scores and/or metascores.

Entity activity data, data items, and/or other types of data items of the data analysis system may be accessed and/or received from various databases and data sources including, for example, databases maintained by financial institutions, government entities, private entities, public entities, and/or publicly available data sources. Such databases and data sources may include a variety of information and data, such as, for example, personal information, financial information, tax-related information, web log data, web service data, mobile device usage data, mobile app log data, computer network-related data, and/or any computer-related activity data, among others. Further, the databases and data sources may include various relationships that link and/or associate data items with one another. Various data items and relationships may be stored across different systems controlled by different entities and/or institutions. According to various embodiments, the data analysis system may bring together data from multiple data sources in order to build clusters.

In various embodiments the system may further cluster the entity data items with various other related data items. Clusters of related data items may be generated from initial data items, called "seeds." In various embodiments, seeds may comprise entity data items determined to have a high likelihood of being involved in money laundering. The processes and methods of applying money laundering indicators to entity activity data to determine entities likely to be involved in money laundering may be referred to as seed generation strategies.

Additionally, in various embodiments the system may score and/or rank entities and/or clusters of entity data items. Further, as described below, in various embodiments entity data items may be clustered in order to score and/or assess a likelihood of money laundering. For example, a particular entity data item may be used by the system as a seed even when the entity data item and/or associated entity is not initially determined to have a high likelihood of being involved in money laundering. In this example, after clustering it may be determined by the system, based on the entity data item's relationship with various other data items, that it likely is involved in money laundering.

In various embodiments, the data analysis system may enable a user to efficiently perform analysis and investigations of various data items (for example, entity data items) and/or clusters of data items. For example, the system may enable a user (also referred to herein as an "analyst") to perform various financial, device based, and security investigations related to an entity and/or a seed (for example, an initial entity data item or data object determined to likely be involved in money laundering). In such an investigation, the system may enable an analyst to search and/or investigate several data items and/or several layers of related data items. For example, a financial account user may be a seed that is linked by the system to various data items including, for example, an IP address or computing device that regularly accesses the financial account's web or mobile interface. Further, the system may link, for example, various other computing devices or IP addresses that also access the same account or use the same user ID at a financial institution, to the seed financial account user. Accordingly, in various embodiments, the system may automatically determine and provide to a user or analyst various layers of data items related to the seed financial account. Such an investigation may, in an embodiment, enable the analyst to determine money laundering. For example, if the seed financial account user was suspected to be involved in money laundering, then the analyst may determine that the additional computing devices may also be involved in money laundering. Further, if the seed financial account user was linked to other known entities involved in money laundering, the analyst may determine that the seed financial account user was likely to be involved in money laundering. As mentioned above, in such an investigation the analyst may discover relationships between the additional entities and the seed financial account user through several layers of related data items. Such techniques, enabled by various embodiments of the data analysis system, may be particularly valuable for investigations in which relationships between data items may include several layers, and in which such relationships may be otherwise very difficult or impossible to manually identify.

In various embodiments, the data analysis system may automatically generate, or determine, seeds based on a seed generation strategy (also referred to as "seed generation rules"). For example, for a particular set of data items, the data analysis system may automatically generate, based on a seed generation strategy, seeds by designating particular data items (or groups of data items) as seeds. Examples of various seed generation strategies are described below. In various embodiments, processes and methods of applying money laundering indicators to entity activity data to determine entities likely to be involved in money laundering may be referred to as seed generation strategies/rules.

Further, in various embodiments, the data analysis system may automatically discover data items related to a seed, and store the resulting relationships and related data items together in a "cluster." A cluster generation strategy (also referred to as "cluster generation rules") may specify particular searches to perform at each step of an investigation, or cluster generation, process. Such searches may produce layers of related data items to add to the cluster. Thus, according to an embodiment, an analyst may start an investigation with the resulting cluster, rather than the seed alone. Starting with the cluster, the analyst may form opinions regarding the related data items, conduct further analysis of the related data items, and/or may query for additional related data items.

According to various embodiments, the data analysis system may further generate various "cluster scores." Cluster scores may include scores based on various characteristics and/or attributes associated with the cluster and/or the various data items of the cluster. In various embodiments, the data analysis system may also generate "cluster metascores" which may include, for example, an overall cluster score. Cluster metascores may, for example, be based on a combination of cluster scores of a cluster associated with a seed. The processes of scoring entity data items for money laundering, and scoring clusters of entity activity data items, may be similar and the description of either (below) may also apply to the other.

Further, in various embodiments, for a particular set of data items, multiple clusters may be generated by the data analysis system. For example, the data analysis system may generate multiple seeds (for example, the corresponding entity data items for identified financial accounts, computing devices, IP addresses, etc.) according to a seed generation strategy, and then multiple clusters based on those seeds (and based on a cluster generation strategy). In such embodiments, the data analysis system may prioritize the multiple seeds and/or generated clusters based upon money laundering and/or cluster scores and/or cluster metascores. In an embodiment, the data analysis system may provide a user interface including a display of summaries of the entities and/or clusters, including scores, metascores, and/or various other information. Such summaries may be displayed according to a prioritization of entities and/or clusters. In various embodiments, such prioritization may assist an analyst in selecting particular entities and/or clusters to investigate.

In the following description, numerous specific details are set forth to provide a more thorough understanding of various embodiments of the present disclosure. However, it will be apparent to one of skill in the art that the systems and methods of the present disclosure may be practiced without one or more of these specific details.

III. Examples of Data Items, Properties, and Links

In various embodiments, different types of data items may have different property types. For example, a "financial account" data item may have an "Account Number" property type, a "Person" data item may have an "Eye Color" property type, a "Device" data item may have a "browser" or "browser version" property type, and an "Event" data item may have a "Date" property type. Each property as represented by data in a database may have a property type defined by an ontology used by the database. Further, data items may be instantiated in a database in accordance with a corresponding object definition for the particular data item in the ontology. For example, a specific monetary transaction or payment (for example, an entity of type "event") of US$30,000.00 (for example, a property of type "currency" having a property value of "US$30,000.00") taking place on Jun. 30, 2012 (for example, a property of type "date" having a property value of "Jun. 30, 2012") may be stored in the database as an event object with associated currency and date properties as defined within the ontology.

Data items defined in an ontology may support property multiplicity. In particular, a data item may be allowed to have more than one property of the same property type. For example, a "Device" data item may be associated with multiple financial accounts ("financial account" properties), locations ("Geolocation" properties) or IP addresses ("IP Address" properties), or a "Person" data object may have multiple "Address" properties or multiple "Name" properties.

A link represents a connection between two data items and may be through any of a relationship, an event, and/or matching properties. A link may be asymmetrical or symmetrical. For example, "Person" data item A may be connected to "Person" data item B by a "Child Of" relationship (where "Person" data item B has an asymmetric "Parent Of" relationship to "Person" data item A), a "Kin Of" symmetric relationship to "Person" data item C, and an asymmetric "Member Of" relationship to "Organization" data item X. The type of relationship between two data items may vary depending on the types of the data items. For example, "Person" data item A may have an "Appears In" relationship with "Document" data item Y or have a "Participate In" relationship with "Event" data item E. As an example of an event connection, two "Person" data items may be connected by an "Airline Flight" data item representing a particular airline flight if they traveled together on that flight, or by a "Meeting" data item representing a particular meeting if they both attended that meeting. In one embodiment, when two data items are connected by an event, they are also connected by relationships, in which each data item has a specific relationship to the event, such as, for example, an "Appears In" relationship.

As an example of a matching properties connection, two "Device" data items may both have an "IP Address" property that indicates an IP address associated with the devices, and that IP address may be the same for both, or may be on the same network or subnet, even if different. In another example, two "IP Address" data items may both have a "Geolocation" property that indicates that these addresses are assigned within the same physical location. If the locations are within the same general area, then their "Geolocation" properties likely contain similar, if not identical property values. In one embodiment, a link between two data item may be established based on similar or matching properties (for example, property types and/or property values) of the data item. These are just some examples of the types of connections that may be represented by a link and other types of connections may be represented; embodiments are not limited to any particular types of connections between data items. For example, a web log may contain references to two different entities. For example, the web log may contain a reference to a source financial account (one data item), and a destination financial account (a second data item). A link between these two data items may represent a connection between these two entities through their co-occurrence within the same web log.

In some embodiments, each line of a web log, or any collection of data indicating how a financial account was be used such as a log/data created by a bank's mobile application (all of which may be referred to as comprising account usage data items or entity activity data items (e.g. log lines, entries, and/or records)), can comprise multiple identifiers in a single log line. For example, a single log line may include a time stamp, the accessed financial account, the user accessing the financial account, the device accessing the financial account (represented via a device ID/fingerprint/or one or more multiple characteristics of a device that allow for a unique or near-unique identification of a device), the IP address of the device accessing the financial account, and any action, activity, or function initiated by the user or device on the bank's website or mobile application.

Each data item may have multiple links with another data item to form a link set. For example, two "Device" data items may be linked through a "geolocation" relationship, a matching "time zone" property, and/or one or more matching "Event" properties (for example, accesses the same financial account). Each link, as represented by data in a database, may have a link type defined by the database ontology used by the database.

In various embodiments, the data analysis system may access various data items and associated properties from various databases and data sources. Such databases and data sources may include a variety of information and data, such as, for example, personal information (for example, names, addresses, phone numbers, personal identifiers, and the like), financial information (for example, financial account information, transaction information, balance information, and the like), tax-related information (for example, tax return data, and the like), device related data, computer network-related data (for example, network traffic information, IP (Internet Protocol) addresses, user account information, domain information, network connection information, web logs (including financial account access logs) and the like), and/or computer-related activity data (for example, computer events, user actions, money laundering black lists or grey lists and the like), entity histories, previous investigations, among others.

IV. Description of the Figures

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

a. Example Data Analysis System

FIG. 1 is a block diagram illustrating an example data analysis system 100, according to an embodiment. As shown in the embodiment of FIG. 1, the data analysis system 100 includes an application server 115 running on a server computing system 110, a client 135 running on a client computer system 130, and at least one data store 140. Further, the client 135, application server 115, and data store 140 may communicate over a network 150, for example, to access data sources 160.

The application server 115 may include a rules engine 120 and a workflow engine 125. The rules engine 120 and a workflow engine 125 may be software modules as described below in reference to FIG. 5. According to an embodiment, the rules engine 120 is configured to apply one or more money laundering seed generation strategies (e.g., including one or more money laundering rules or indicators) to various entity data items, score entity data items based on money laundering scoring criteria (e.g., as defined in the one or more seed generation strategies), build one or more clusters of related data items according to one or more cluster generation strategies, and/or score clusters based on cluster scoring criteria (e.g., as defined in the one or more seed generation strategies). The rules engine 120 may read data from a variety of data sources 160 to obtain entity data items, entity activity data items, obtain other types of data items, and/or generate clusters from seeds (also referred to as "seed data items"). Once processed, entity data items (and other types of data items) and/or clusters may be stored on the server computing system 110 and/or on the data store 140. The operations of the rules engine 120 are discussed in detail below in reference to FIGS. 2A-2D and 3A-3C.

As mentioned, in an embodiment, the rules engine 120 may be configured to score the entity data items and/or data item clusters, according to a money laundering scoring criteria and/or cluster scoring criteria (e.g., as defined in a cluster scoring strategy). A score may indicate a likelihood that an entity or cluster is involved or otherwise associated with money laundering and/or an importance of further analyzing an entity or cluster. For example, with respect to a cluster likely to be associated with money laundering, including several financial accounts, the rules engine 120 may execute a scoring strategy that aggregates the account balances of the financial accounts within the cluster because, for example, a large aggregated total balance may indicate a large money laundering liability for a financial institution, a cluster with such a large total balance may be considered to have a higher score relative to other clusters with lower aggregated total balances (and, therefore, lower scores). Thus, a cluster with a higher score relative to a cluster with a lower score may be considered more important to analyze.

In an embodiment, the rules engine 120 organizes and presents the entities and/or clusters according to the assigned scores. The rules engine 120 may present summaries of the entities and/or clusters, and/or interactive representations of the clusters within an analysis user interface. For example, the representations may provide visual indications (for example, graphs or other visualizations) of entity data items and/or related data items within various clusters. The rules engine 120 may generate an analysis user interface, such as a web application and/or a dynamic web page displayed within the client 135. The rules engine 120 may also allow an analyst to create tasks associated with the entities and/or clusters. In an embodiment, the rules engine 120 evaluates entities and/or generates clusters automatically, for example, for subsequent review by analysts.

The application server may further include a workflow engine 125. The workflow engine 125 may generate and/or provide the various user interfaces of the data analysis system. Analysts may assign tasks to themselves or one another via a workflow user interface generated by the workflow engine 125, for example. In another example, the workflow engine 125 may present various data generated by the rules engine 120. For example, the workflow engine 125 may present an analyst with entities and/or clusters generated, scored, and ordered by the rules engine 120.

The client 135 may represent one or more software applications or modules configured to present data and translate input, from the analyst, into requests for data analyses by the application server 115. In one embodiment, the client 135 and the application server 115 may be embodied in the same software module and/or may be included in the same computing system. However, several clients 135 may execute on the client computer 130, and/or several clients 135 on several client computers 130 may interact with the application server 115. In one embodiment, the client 135 may be a browser accessing a web service. In various embodiments, a component of the system, for example the workflow engine 125, may generate user interfaces (for example, that may be transmitted to a display or browser and displayed to an analyst) and/or may generate instructions or code useable to generate a display and/or user interface (for example, that may be transmitted to a display or browser where a user interface may be generated and displayed to an analyst).

While the client 135 and application server 115 are shown running on distinct computing systems, the client 135 and application server 115 may run on the same computing system. Further, the rules engine 120 and the workflow engine 125 may run on separate applications servers 115, on separate server computing systems, or some combination thereof. Additionally, a history service may store the results generated by an analyst relative to a given entity and/or cluster In an embodiment, the data sources 160 provide data available to the rules engine 120, for example entity activity data, which may include financial account usage data. The data sources 160 may provide various data items such as entity activity data items to the rules engine 120 for determination of likely entities involved with money laundering (for example, generation of seeds) and/or to create or generate clusters from a seed or a set of seeds. Such data sources may include relational data sources, web services data, XML data, and the like. Further, such data sources may include a variety of information and data, for example, web log information (including access logs and network interactions of devices and/or IP addresses initiating actions on accounts, such as a bank transfer) personal information, financial information, tax-related information, computer network-related data, and/or computer-related activity data, device, IP address, or money laundering black or grey lists, entity investigation histories, entity money laundering histories, among others. For example, the data sources may be related to financial account records stored by a financial institution, and operations on those accounts (such as bank transfers) by users, devices and/or IP addresses. In such a case, the data sources may include entity activity data, such as financial operations taken by a user, device or IP address (deposits, transfers, purchases, withdrawals, etc,), location data for the devices or IP addresses (or a lookup service to determine such a device's or IP address's location via geolocation of an IP address, device time zone, or other means), financial account data, customer data, and transaction data. The entity activity data may include data attributes such as device characteristics, HTTP headers/user agent information, IP addresses, account numbers, account balances, phone numbers, persons, addresses, transaction amounts, and/or the like. Of course, data sources 160 are included to be representative of a variety of data available to the server computer system 110 over network 150, as well as locally available data sources.

The data store 140 may be a Relational Database Management System (RDBMS) that stores the data as rows in relational tables. The term "database," as used herein, may refer to an database (e.g., RDBMS or SQL database), or may refer to any other data structure, such as, for example a comma separated values (CSV), extensible markup language (XML), text (TXT) file, flat file, spreadsheet file, and/or any other widely used or proprietary format. While the data store 140 is shown as a distinct computing system, the data store 140 may operate on the same server computing system 110 as the application server 115.

Additional details of the server computing system 110, the data sources 160, and other components of the data analysis system are described below in reference to FIG. 5.

b. Example Methods of the Data Analysis System

Figure 1B:
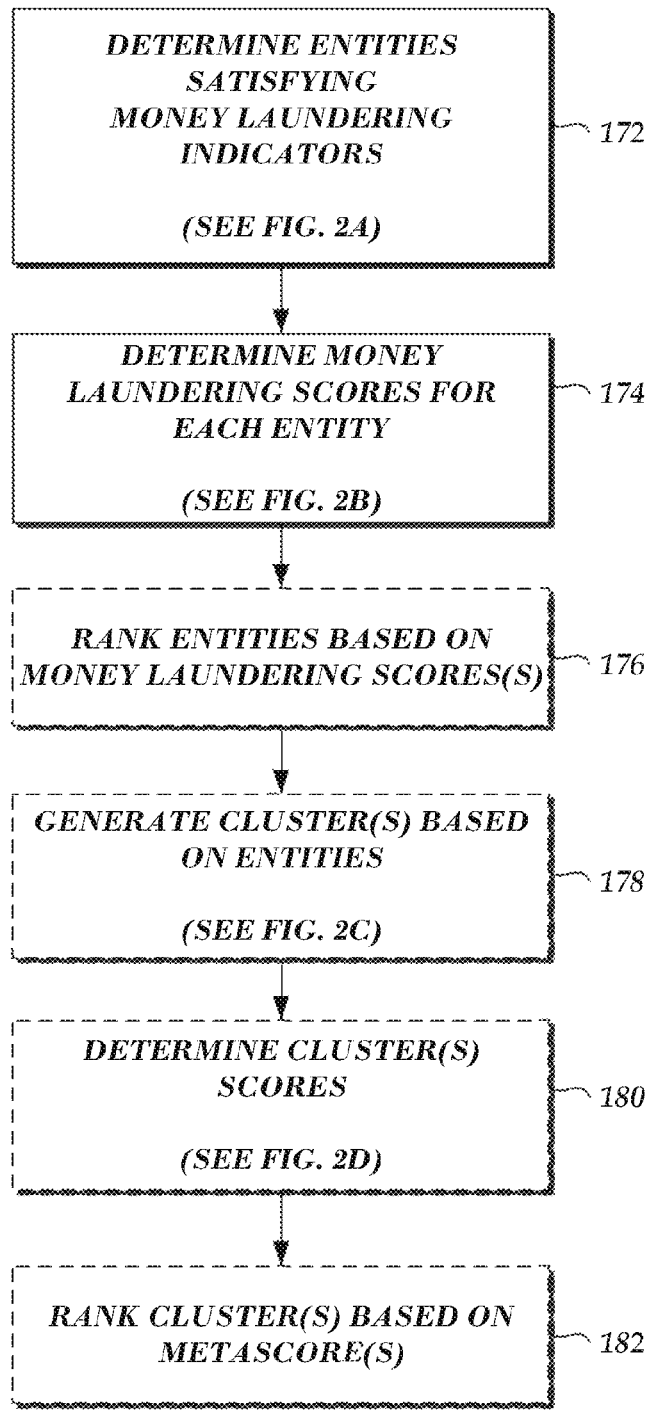
FIG. 1B is a flowchart of an example method of the data analysis system, according to various embodiments of the present disclosure.

FIG. 1B is a flowchart of an example generalized method of the data analysis system, according to various embodiments of the present disclosure. In various embodiments, fewer blocks or additional blocks may be included in the process, or various blocks may be performed in an order different from that shown in the figure. In an embodiment, one or more blocks in the figure may be performed by various components of the data analysis system, for example, server computing system 110 (described in reference to FIG. 1 above and FIG. 5 below).

The flowchart of FIG. 1B shows an overview of various processes of the data analysis system, the details of which are described in reference to the flowcharts of FIGS. 2A-2B below. By the method of FIG. 1B, the system may detect and/or identify potential computing devices, IP addresses, and financial accounts (or users/user IDs associated with such financial accounts) associated with money laundering activity.

At block 172, the system may determine one or more entities and their corresponding entity data items (e.g., representing entities or other data items) satisfying various money laundering indicators. Details of an example of this process are described below in reference to FIG. 2A. At block 174, the system may determine one or more money laundering scores and/or metascores for each of the entity data items corresponding to the entities. Details of an example of this process are described below in reference to FIG. 2B. At optional block 176, the system may rank the entity data items corresponding to the entities based on the determined money laundering scores. An example of ranked entities is shown in an example user interface in FIG. 4. At optional block 178, the system may generate clusters of related data items based on the determined entity data items likely involved with money laundering, or associated with money laundering as determined by the data analysis system based on the money laundering scores for each entity in block 174. Details of an example of this process are described in reference to FIG. 2C. At optional block 180, the system may determine one or more cluster scores and/or metascores for each of the clusters. Details of an example of this process are described below in reference to FIG. 2D. At optional block 182, the system may rank the clusters based on the determined cluster scores and/or metascores. An example of ranked clusters is also shown in the example user interface of FIG. 4. As described, each of blocks 176-182 are optional, and in some embodiments may not be performed by the system.

In various embodiments, the data analysis system may or may not generate multiple scores for each entity and/or cluster, may or may not generate metascores for each entity/cluster, and/or may or may not rank the entities/clusters. In an embodiment, the system may rank entities/clusters based on one or more scores that are not metascores.

Further, as described below, in an embodiment entity data items satisfying a money laundering score threshold may be used as seeds for generating data item clusters. Alternatively, data item clusters may be generated for any determined entity/entities. Seeds may include one or multiple data items. Similarly, the clusters may include one or multiple data items related to a seed, including the seed, and may be generated based on cluster strategies or rules (also referred to as "cluster generation strategies"). Scores and metascores may be determined based on attributes, characteristics, and/ or properties associated with an entity data item and/or data items that make up a given cluster.

In various embodiments, in each of the flowcharts described below in reference to FIGS. 2A-2D, fewer blocks or additional blocks may be included in the example processes depicted, or various blocks may be performed in an order different from that shown in the figures. Further, in various embodiments, one or more blocks in the figures may be performed by various components of the data analysis system, for example, server computing system 110 (described above in reference to FIGS. 1 and 5) and/or another suitable computing system.

Figure 2A:
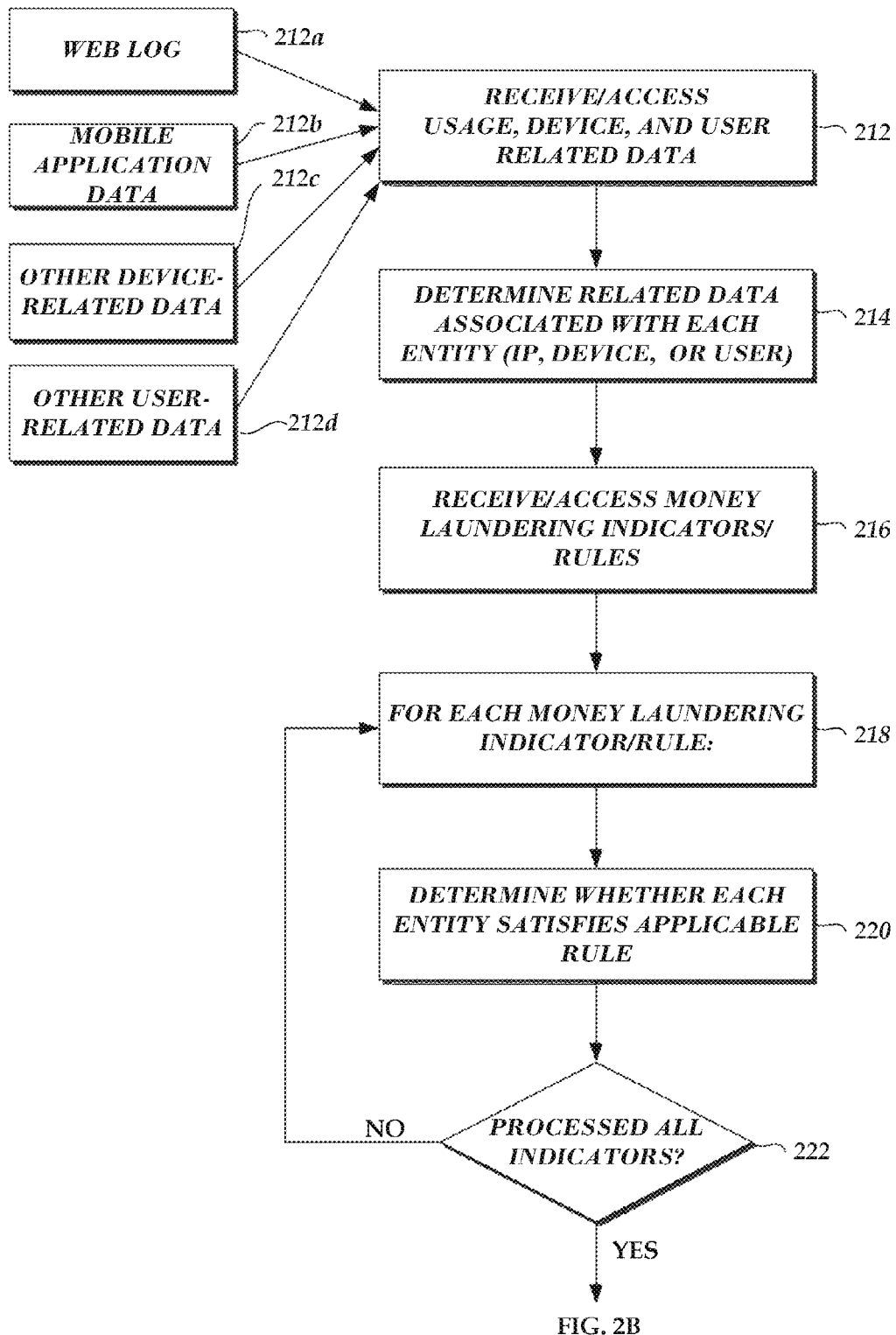
FIG. 2A is a flowchart of an example of a money laundering data analysis method of the data analysis system, according to various embodiments of the present disclosure.

FIG. 2A is a flowchart of an example of an entity activity data analysis method of the data analysis system in which entity activity data is analyzed based on one or more money laundering indicators or rules, according to various embodiments of the present disclosure. The flowchart of FIG. 2A may correspond to block 172 of the flowchart of FIG. 1B. As described below, the one or more money laundering indicators, when applied to data related to an entity data item, may indicate a likelihood that the entity data item is involved in or associated with money laundering. For example, an entity satisfying one or more of the money laundering indicators may indicate that the entity is potential involved in money laundering activity. This is because, at least in part, entities involved in money laundering may exhibit particular behaviors, and/or may have particular characteristics, that may be identified by the system by application of the money laundering indicators.

As described above, money laundering activity may include, for example, a person or group engaging in financial activity to illegally transfer money or disguise the source of money. Examples of money laundering may include transfers of money, or obfuscation of the source of money, so as to transform proceeds of illegal activity into ostensibly legitimate money or legitimate assets. Money laundering may also include any misuse of the financial system (usually performed via money transfer), including terrorism financing, tax evasion, international sanction evasion, import/export restrictions evasion, or other prohibited activities. Money laundering may include avoiding prohibitions that may include the source of a transfer (e.g. money from illegal crime activities such as extortion, insider trading, drug trafficking, illegal gambling, tax evasion etc.), or the destination of a transfer (e.g. money destined for a terrorist organization or to be imported to a specific country such as the US). Money laundering may also include the layering, integrating, or combining of illegal funds with legitimate funds, so as to conceal the source of funds. Money laundering may also include, in addition to money transfers, the purchase of assets that can conceal a source, such as securities, digital currencies (e.g. bitcoin), credit cards, cash, coupons, virtual currency, on-line game credits, etc. Money Laundering may include cross nation access/transfers, smurfing, currency exchanges, double-invoicing, structuring, bulk cash smuggling, cash-intensive businesses, trade-based laundering, shell companies and trusts, round-tripping, bank capture, casinos, real estate, tax amnesties, fictional loans, etc.

Advantageously, according to various embodiments, the system may enable analysts of, for example, financial institutions such as banks, to efficiently identify entities that are (or were) potentially involved in money laundering (for example, computing devices that access financial accounts, where those computing devices all meet a specific criteria, such as a pattern of movement of money between physical locations of the computing devices).

Referring again to the flowchart of FIG. 2A, at block 212, entity activity data and/or data items may be received and/or accessed by the data analysis system. For example, entity activity data items may include web logs (212*a*), mobile application data (212*b*), any other device related data (212*c*), and or any other financial entity activity data (such as bank transfers or financial account accesses) and/or other user-related data (212*d*), or other data sources which may provide a signal to detect money laundering. Such entity activity data may be accessed and/or received from, for example, various data sources 160 (as shown in FIGS. 1 and 5). In various embodiments, entity activity data may be accessed from various data sources, as described herein. Further, entity activity data accessed from the various data sources may be normalized and/or adapted such that it may be read and/or manipulated by the system (as described below in reference to FIG. 5).

Web logs (212*a*) may comprise multiple log lines describing accesses/network transactions between a browser client and a banking or financial server. Each log line may comprise a timestamp of an HTTP/HTTPS request, a source IP address, a username of a customer/person accessing the financial website, an account being accessed, and/or a device ID or fingerprint (such as an active directory token, persistent cookie, hash ID, or one or more multiple characteristics providing enough entropy so as to uniquely or identify or classify a device). The web log may also indicate specific actions taken by devices/users on a website, such as access to web pages or functions that indicate a bank transfer, withdrawal, or deposit. Multiple logs may be used to stitch together a full understanding of actions on a website (such as correlating device/cookie IDs in a web log with database logs indicating user actions during similar time periods and/or using the same IP address, etc.), and such a collection of data may be considered a data source (or data sources) used by the data analysis system.

Mobile Application Data (212*b*) may comprise data locally stored by a mobile application and sent over a network. For example, many banking institutions have their own mobile applications to access financial accounts. These mobile applications may run on many devices, including mobile android devices, iOS devices, etc. As mobile applications may allow a customer to access a financial institutions accounts, these applications may collect information about the mobile device and its interactions. Such information may comprise similar data as the web log data (212*a*), but may also include other information, such as the geolocation of the mobile device while accessing the mobile application (e.g., GPS coordinates, travel speed, accelerometer information, time zone/clock setting information, etc.) Any information collected by the mobile application on the mobile device may then be sent to a server or database, to be accessed as a data source (or data sources)

Other device related data (212*c*) may include a variety of information, such as device black lists or histories of activities for known devices (e.g., tracked by fingerprint, characteristics, cookie, etc.). Additionally, such data may be generated on the fly. For example, each IP address used by a device, or appearing in a log, may have an associated approximate geo-location. A network service may be used to analyze each IP address associated with a device to determine the approximate geolocation of a device during a specific time period each IP address was used, during a specific transaction, etc. In some embodiments, a network service need not be used. Instead, a local table or database may be consulted that may map IP addresses to specific geo locations in order to determine an IP addresses or devices location. Such a lookup may be a part of preprocessing of the data sources 212*a*, 212*b*, 212*c*, and 212*d*, or may be performed on the fly by the data analysis system.

Other user related data sources (212c) may include lists of financial accounts, their associated users/customers, known financial accounts associated with money laundering, customer black lists, money laundering investigation histories, or other data. A customer black list may comprise a list of known persons or business entities that have been designated as associated with money laundering, and should be avoided by all banks. The list may comprise personally identifiable information (e.g. a Person object's properties or known devices of the Person) that can be used for detecting relationships to other data to determine other associated entities (e.g., a device that may have been used by a black listed person).

Each of the above data sources may comprise one or more entity activity data items including account usage information, as each data source usually includes multiple entries (e.g. log lines) indicating a relationship of each entity with a financial account (e.g. using variable placeholders, entity X at time T accessed account Z from IP A.B.C.D to perform account function W).

In some embodiments, the entities examined by the data analysis system may be generated by extracting entities from a portion of, or all of, the data sources comprising entity activity data items. For example, the data analysis system may extract device identifiers, user identifiers, financial accounts, and IP addresses from a bank's web logs or transaction logs, in order to create a list of a plurality of entities to examine.

At block 214, the system may determine one or more entities with which the received data are related. For example, the received entity activity data may include various devices IDs (fingerprints, HTTP characteristics, etc.), IP addresses, customers, transactions, phone numbers, addresses, person identifiers, and/or the like that may each be related to one or more entities. The system may determine which data items are related with which entities such that the entities may be evaluated for potential money laundering, as described below. For example, for each device or IP address, the data analysis system may look up or determine the device's physical location for one or more time periods based on a web log entry, mobile application data, a geolocation mapping, and/or a geolocation lookup service.

At block 216, various money laundering indicators or rules may be received and/or accessed by the data analysis system. Money laundering indicators may include, for example, various data, rules, and/or criteria that may be compared with the entity activity data items (for example, device/IP address bank web service/mobile application transaction information) to determine whether an entity is likely involved in money laundering.

In some embodiments, a money laundering indicator may use physical location of access by an entity to a financial account. As described herein, the data analysis system can examine an entity's activity through the use of data sources comprising web logs or mobile application logs of a bank interaction with customer devices. The logs may provide multiple access times for each device, the customer associated with access (such as a user ID that is affiliated with the financial account and associated with a user/customer profile), a device fingerprint (such as an Active Directory token, persistent cookie, browser characteristics, etc.), a device's location during the activity, and/or an IP address. In some embodiments, geolocation data for activity may be discovered by looking up an IP addresses in a geolocation database, or may be supplied by a mobile device in a log as activity is occurring.

The entity activity data (also known as account usage data) above can be used to track and determine an entity's physical movements. For example, the data could show that on Mar. 24, 2011, user ABCD accessed financial account 12345 using device XY and IP address 128.200.83.5. The IP used may correspond to an IP address associated with Venezuela as determined by an IP geolocation database. The same user ABCD may have then accessed financial account 12345 on Apr. 4, 2011 using his mobile device WZ and IP address 34.48.98.123. The mobile device may have used a banking application that could read the mobile device's GPS coordinates (as determined by the mobile device) at the time of access. This information may have been reported to the bank's servers and recorded in the log. Using a GPS coordinate database, the GPS coordinates may indicate that the device was in Mexico. On Apr. 7, 2011, user ABCD may have accessed the same financial account with device XY and an IP address affiliated with the United States. Using this information, the data analysis system can determine a path that the user is travelling. The data analysis system can group or sort access information by device, or user, etc. so that patterns of access can emerge for each device or user.

Such a path or pattern can be compared to money laundering indicators (such rules can also be referred to as money laundering profiles). For example, a rule may specify that users or devices traveling through explicitly risky countries or exhibiting a certain profile of behavior (moving across known drug trade/trafficking routes) can indicate a likelihood of money laundering activity associated financial accounts accessed by those users or devices. For example, one money laundering indicator could be satisfied if a user or device accessed a financial account from at least two risky jurisdictions. Another example money laundering indicator could require a pattern of movement to be satisfied.

Figure 3A:
FIG. 3A is a map illustration of an example of a money laundering indicator/rule, according to various embodiments of the present disclosure.

For example, in FIG. 3A, Colombia 391, Venezuela 392, and Argentina 393 could comprise a first area of an indicator (1), Ecuador 395, Mexico 394, and the Bahamas 396 could comprise a second area of the indicator (2), and the United States 397 could comprise the last area in the indicator (3). The indicator could be satisfied if there was any movement detected (via the bank access) from the first area (1), then the second area (2), and then the third area (3), indicating a movement pattern that could be used by drug traffickers. Such a movement pattern could have a time requirement. For example, an indicator may be created that requires movement between the first area (1) and the second area (2) to occur within 3 days, and the movement between the second area (2) and the third area (3) to occur within 5 days of the first movement. Such an order of movement, or pattern of movement, is but one example of a money laundering indicator that could be created for the data analysis system to use in comparison to the activities of all the entities the data analysis system is aware of.

Each entity that matches such an indicator could then be used as a seed for a cluster. For example, if a device was an entity that exhibits such movement behaviors and satisfied the indicator, then a cluster can be built by the system that shows other related users that used the device, and the accounts those users accessed, and so on. Likewise, if a user satisfied the movement based rule, the user's profile can be used to determine the customers associated with the user, all other financial accounts of the user, and the user's personally identifiable information (phone numbers, addresses, etc.), each of which can be used again to further expand the cluster into additional cluster levels. The additional clustered information can be useful to find other devices, financial accounts, IP addresses, or users associated with money laundering, either automatically, or by additional analysis by an analyst.

FIG. 3B shows a table listing other example money laundering indicators, according to various embodiments of the present disclosure. Each of the listed example money laundering indicators, when applied to an entity data item and related data (for example, transaction information), may provide an indication of potential money laundering. For example, it may be known that device accesses of financial accounts from physical locations associated with drug trafficking may indicate money laundering potential. Accordingly, a money laundering indicator/rule may analyze the various entity data items to determine whether the devices or IP addresses entities match (for example) a location based money laundering indicator/rule. If so, the entities may have a higher likelihood of being associated with a money laundering, as may be indicated by the system.

Examples of money laundering indicators may include, but are not limited to:

Access to a financial account from a physical location associated with drug trafficking, or from locations indicating a known pattern of drug trafficking (e.g. Columbia, then Mexico, then United States).

A device's fingerprint is known to be on a "bad fingerprint" list, IP address on a "bad IP address" list, or a user is known to be on a known money laundering user list.

A device or IP address logs into an account already known to be affiliated with money laundering, or a user logs into an account with a device or IP address already know to be affiliated with money laundering.

A user, IP address, or device accessing the financial account has a history of previous money laundering investigations.

A user, IP address, or device is involved in a transaction matching money laundering criteria (e.g., threshold value of a transaction, conversion to specific currency, etc.).

Accounts in which a particular dollar amount (or at least a particular dollar amount) is sent from a credit line to a credit union, or is a part of any financial transfer.

IP address or device used to access financial account is from a known high-risk area for money laundering.

Financial account is accessed from multiple physical locations within an unreasonable time period for travelling between physical locations.

A single device accesses multiple financial accounts from distinct physical locations from within a threshold time period.

A device accesses a financial account during a particular high risk time period for money laundering.

A device, user, or IP address exceeds a threshold number of failures at initiating a financial transaction for a financial account.

A device's configuration change matches a pattern for money laundering, such as whether a device's clock time frequently changes between a Russian time zone and a US time zone, or the device's geolocation as determined by GPS does not match the device's IP address based geolocation.

The date and times of a device, user, or IP address's access of a financial account matches a timing pattern indicating money laundering.

Multiple transactions of a user, device, or IP, indicates a charge for money laundering services. For example, multiple financial accounts transferring 90% of an initial deposit (indicating each account in a chain is keeping a 10% money laundering fee).

A user accessing financial account is affiliated with a user watch list.

A device or IP address accesses financial accounts away from expected locations.

User accesses financial accounts away from known address of user.

Device accessing financial account is known to be in a different location than user affiliated with device or financial account.

As indicated by the example rules above, a variety of factors can be used in order to craft money laundering indicators (i.e. by requiring patterns, orders, threshold values of such factors, etc. that may indicate money laundering), including:

A device's, user's, and/or IP address's determined physical location (e.g., in comparison to areas of higher or lower risk).

Distance of a device or user away from an expected or known location, or any location affiliated with the entity (e.g. a registered postal address)

Whether or not a device or user is operating within an expected location of operations.

The destination or source of a money transfer

Historical trends of an entity, such as a significant change in usual banking activity of a device or user History of investigations of an entity Blacklists of entities (no fly list, prohibited devices or IP addresses, etc.)

A dollar value of a transaction or money transfer

A change or conversion of currency

Detectable percentage "cuts" (e.g. 10% of an amount) in one or more transactions The time a user or device accesses a financial institution from a particular location (e.g., in comparison to the time required to physically travel between two locations from which access occurred)

Expected times of access from a physical location by a device or user

Watch lists of known user accounts (e.g., terrorist or no-fly watch list, etc.)

Changes in device identifiers, configuration, or networking (e.g., fake reporting of OS/browser, using VPN's to disguise network location or IP, etc.)

Failed attempts at a transaction (login, money transfer, etc.)

Types of transactions, or patterns thereof (ATM, wire, cash, deposit, credit/debit)

Each of the above data and indicators, as well as many others, can also be used as, or to form, money laundering scoring criteria as well, as described herein.

In each of the money laundering indicators listed above (or any indicators than can be crafted with the data or data types listed above) or in other places in the present disclosure, the system may be configured to match at least one of the indicators, a particular number of the indicator, a particular subset of the indicators, and/or at least a particular number of the indicators. Further, one or more of the money laundering indicators, and/or aspect of the money laundering indicators, may be combined and/or rearranged to comprise other or additional money laundering indicators. For example, each of the money laundering indicators listed above that refer to a device may, in some embodiments, be used with IP addresses instead or in combination. Additionally, other money laundering indicators may include, for example, any of the cluster scoring criteria described below.

Such money laundering indicators may be derived from automatic or manual analysis of entity activity data. For example, the data analysis system may automatically process large amounts of entity activity data across multiple years to determine various indicators and/or data items.

In each of the above listed examples, various items of information related to entities may be determined and/or accessed by the system. For example, device locations, IP address locations, users or accounts associated with each device/IP address, account numbers, transactions, numbers of transactions, transaction originators and/or recipients (including originating devices/IP addresses), and/or sums of transaction amounts (just to name a few) may be determined by the system and may be used to determine a likelihood of money laundering and/or scoring of particular entities (as described below in reference to FIG. 2B). In a particular example mentioned above, mobile devices associated with (and/or used to access) particular accounts may be determined. Each of the above mentioned data items (including mobile devices, IP addresses, phone numbers, accounts (and related data), persons, and the like) may be used in analyzing entity data items. In various embodiments, various money laundering indicators may be determined (for example, by empirical investigation and/or user preference) to be more or less important in determining a likelihood of money laundering (as described below).

In an embodiment, money laundering indicators may also be derived from known lists, and/or may be provided by an analyst or other user of the data analysis system. In various embodiments, money laundering indicators may be referred to as business rules. Further, in various embodiments and as described above, the money laundering indicators may define suspicious characteristics that may be associated with entity activity data items that may indicate possible money laundering.

Referring again to FIG. 2A, at blocks 218-222, the entity activity data may be analyzed in view of, or compared to, the various money laundering indicators, and particular entity activity data items that may be associated with money laundering are determined. For example, an entity data item may be associated with one or more of the indicators described above. In this example, the entity data item may be determined by the system possibly to be related to money laundering.

Specifically, as indicated by block 218, each of the money laundering indicators may be processed such that, at block 220, it may be determined whether each entity data item (and its associated data) satisfies the indicator/rule. For example, it may be determined whether a particular device is associated with multiple accounts, at least one of which is known for money laundering. At block 222, if all the money laundering indicators are not yet processed, the method continues back to block 218 to process additional indicators. However, if all indicators have been processed, the method continues to FIG. 2B. At this point, each of the money laundering indicators may have been processed, and the system may have determined, for each of the entity data items, whether the entity data item satisfies each of the indicators.

Money laundering indicators may be created via a feedback loop, either automatically, or with the assistance of an analyst. Initial money laundering indicators may be created or input in to the system by an analyst in order to initiate the data analysis system. Over time, the money laundering indicators may change or additional indicators may be incorporated into the system. These changes or additional indicators can be created either manually or automatically based on feedback.

In an embodiment that incorporates feedback manually, an analyst may create new indicators based on past investigations. For example, if the data analysis system indicates to the analyst over time, that many devices always tunnel their access through a Russian IP address prior to engaging in money laundering, then the analyst may create an additional indicator of money laundering that, where a device has a Russian IP address, the money laundering indicator would be satisfied. Through this type of feedback process, the data analysis system can improve or be changed to catch trends in money laundering activity.

In an embodiment that incorporates feedback automatically, new indicators may be created using automatic data modeling of the system via a feedback model. Such modeling techniques can take advantage of models known in the art, such as Bayesian filters, neural networks, etc. After an analyst completes an investigation, the analyst may indicate to the data analysis system a positive or negative result for various entities that informs the data analysis system whether or not entities were actually involved in money laundering. Using this feedback, the data analysis system can alter current indicators. For example, using a modeling technique, the data analysis system can alter its current indicators (e.g., raise or lower a threshold based on the data of known positive and negative money laundering, or add a location to a pattern of locations that indicate money laundering, add users or accounts to a black list based money laundering indicator etc.), or add a new money laundering indicator (e.g., determine a new physical location that is a high risk money laundering area, determine a new configuration change to a device that may indicate money laundering such as a specific browser plugin run by many devices involved in money laundering, etc.)

Figure 2B:
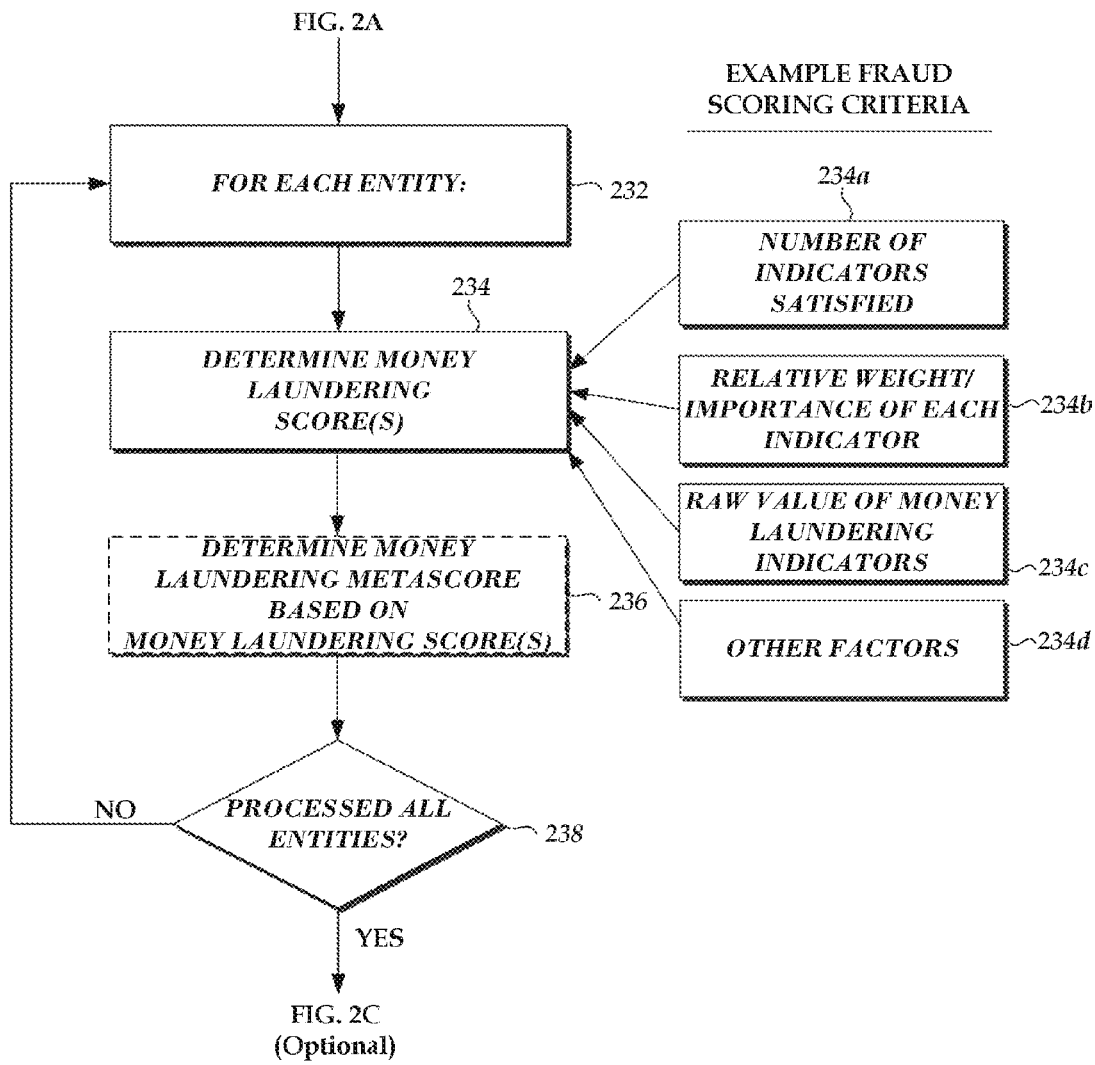
FIG. 2B is a flowchart of an example of an entity money laundering scoring method of the data analysis system, according to various embodiments of the present disclosure.

FIG. 2B is a flowchart of an example of an entity scoring method of the data analysis system, according to various embodiments of the present disclosure. The flowchart of FIG. 2B may correspond to block 174 of the flowchart of FIG. 1B. In general, one or more money laundering scoring criteria may be applied to the entity data items and one or more money laundering scores may be determined. Further, higher money laundering scores may generally indicate a higher likelihood that the particular entity is associated with or involved in money laundering, while a lower score may indicate a lower likelihood that the particular entity is associated with or involved in money laundering (or scoring order may be reversed in other embodiments).

At blocks 232-238, each of the entity data items may be analyzed to determine one or more money laundering scores. As mentioned above, at this point each of the money laundering indicators may have been processed and the system may have determined, for each of the entity data items, whether the entity data item satisfies each of the indicators (or some subset of the indicators that is applied to the entity data items). Accordingly, as indicated by block 232, each of the entity data items may be further processed to determine, at block 234, one or more money laundering scores based on money laundering scoring criteria and the satisfied money laundering indicators. In various embodiments, money laundering scoring criteria may include any of the money laundering indicators described above and/or any other scoring criteria and/or strategies described herein.

Examples of money laundering scoring criteria are shown at blocks 234a-234d. In various embodiments, money laundering scores may be aggregate scores and/or individual scores. For example, an aggregate score may be, for example, a score that takes into account multiple money laundering indicators, while individual scores may be, for example, scores that are based on a single money laundering indicator. The data analysis system may generate either or both types of scores, and/or combinations of the two types of scores. In various embodiments, aggregate scores may also be referred to as metascores.

An example of an aggregate money laundering score may be a score that is based on a sum of a number of money laundering indicators satisfied (234a). For example, it may have been determined that a particular financial account entity satisfied or matched ten money laundering indicators. Accordingly, the account entity may be given an (aggregate) money laundering score of 10. An example of an individual score may be a score that comprises a raw value of a money laundering indicator (234c). For example, it may have been determined that a particular device is associated with accessing a financial account from 5 jurisdictions that are associated with drug trafficking. Accordingly, the account entity may be given a money laundering score of 5.

Each entity may be given multiple money laundering scores, and each money laundering score may be an aggregate score, an individual score, and/or a combination of the two. In an embodiment, each money laundering score may include a raw value and/or a weighted value. For example, a given device entity may be associated with access from two jurisdictions associated with drug trafficking. As described above, when a scoring criterion is applied, the raw value of the score generated would be 2. However, the scoring criteria may also include a relative weighting that indicates the importance of the particular indicator and its associated score ("a number of accesses from illegal jurisdictions") to an overall evaluation of the entity in the context of money laundering (234b of FIG. 2B). Such a relative weighting, in one embodiment, may be a number between 0 and 1, where a number closer to one indicates a greater importance. For example, if the "number of illegal jurisdictions" score is considered relatively important to an evaluation of the entity, it may be given a relative weight of, for example, "0.7". On the other hand, a relatively less important score/consideration (for example, the amount of bank transfers above $10,000 that an entity is involved with) may be given a relative weight of, for example, "0.15". Then, when a score is calculated by the data analysis system, the relative weight may be multiplied by the raw value to arrive at a corresponding relative value. For example, in the "number of illegal jurisdictions" example, where a raw value of 2 was determined, a relative value may be determined by multiplying 2 by 0.7, to arrive at a relative value of 1.4.

In other embodiments, various other methods may be employed by the data analysis system to determine relative values of entity scores. For example, as may be recognized by one of skill in the art, the system may normalize the raw values of each of the scores before applying a relative weighting to arrive at a weighted value. Examples of entity scores presented to an analyst or other user of the data analysis system are shown and described below in reference to FIG. 4. In an embodiment, the importance of particular scores may be determined and/or based on empirical determinations and/or past entity evaluations. For example, over time the system and/or an analyst may determine, based on evaluations of entities by analysts, that particular scores are better indicators of money laundering than others. Such better indicators may be determined to be more important, and may therefore be weighted more heavily by the system. For example, some locations may be more heavily associated with money laundering (such as entities located in Russia or Colombia) and have higher relative scoring versus other locations that may be considered a weaker but still relevant indication of money laundering (Miami) and have lower relative scoring.

In an embodiment, at optional block 236, a money laundering metascore may be generated for the entity. The money laundering metascore may be based on a combination or aggregation of the individual scores generated in block 234. Alternatively, the metascores may be separately determined scores. In an embodiment, a metascore may be calculated by summing, multiplying, and/or otherwise aggregating or averaging the various individual or weighted scores together. The metascore may, in an embodiment, capture the relative importance of each of the individual scores by weighting each of the individual scores in a manner similar to that described above. In an embodiment, as also described above, the metascore may be a sum of the number of money laundering indicators satisfied by the entity.

At block 238, if all the entities are not yet processed, the method continues back to block 232 to process additional entities. However, if all entities have been processed, the method optionally continues to FIG. 2C. At this point, each of the entities may have been processed, and the system may have determined, for each of the entity data items, one or more entities scores that indicate a likelihood that the associated entity is involved in money laundering.

In various embodiments, metascores and/or scores may advantageously enable an analyst to directly compare and/or prioritize various entities, and/or may advantageously be used by the data analysis system to prioritize a list of entities and/or scores related to an entity. Examples of money laundering scores for entities presented to an analyst or other user of the data analysis system are shown and described below in reference to FIG. 4.

Figure 2C:
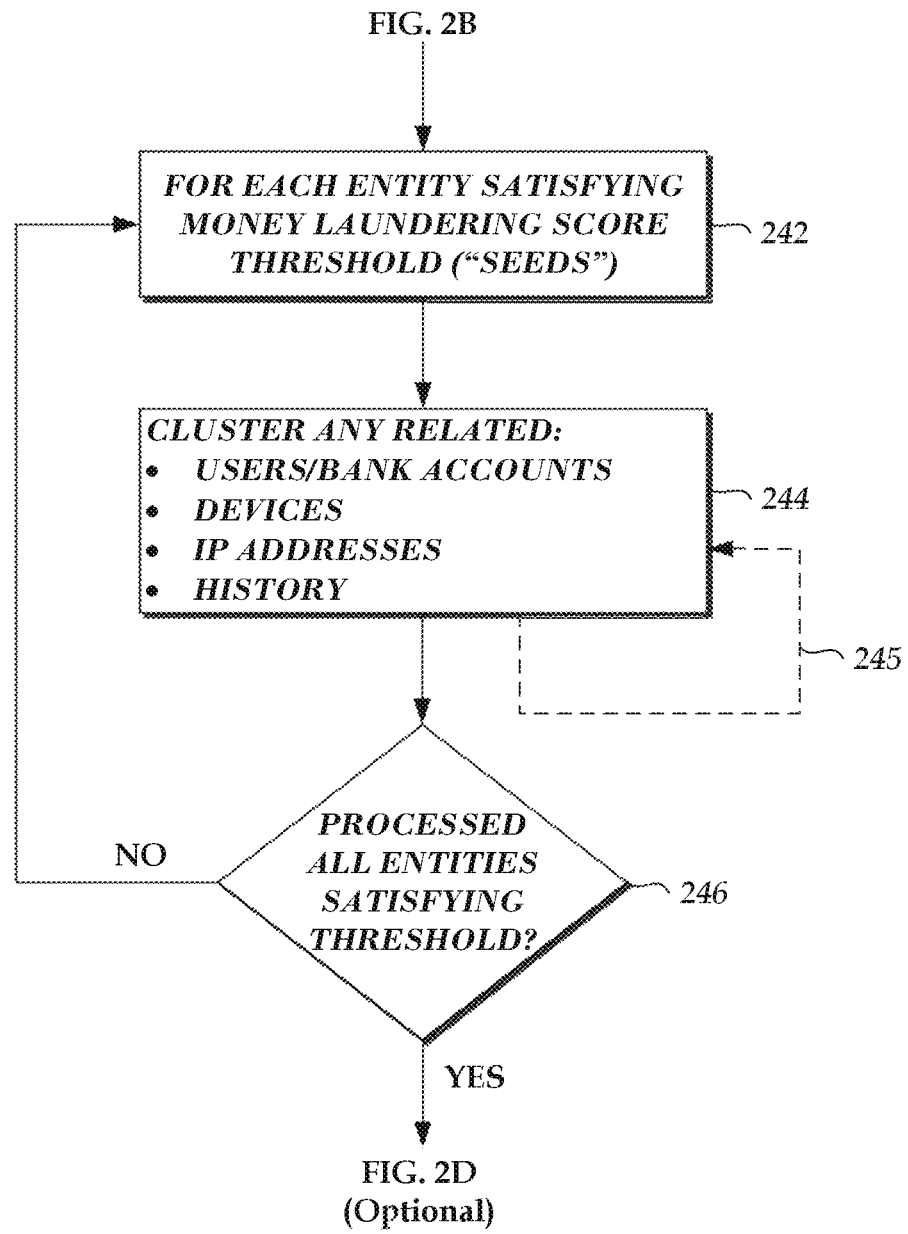
FIG. 2C is a flowchart of an example of a clustering method of the data analysis system, according to various embodiments of the present disclosure.

FIG. 2C is a flowchart of an example of a clustering method of the data analysis system, according to various embodiments of the present disclosure. The flowchart of FIG. 2C may correspond to block 178 of the flowchart of FIG. 1B. As described above, the clustering method shown in FIG. 2C is optional. In general, one or more one or more entity data items may be designated as "seeds," and various related data items may be clustered with the seed. In an embodiment, as shown at block 242, the clustering method may be performed for entity data items with money laundering scores (and/or metascores) that satisfy one or more money laundering score thresholds. Alternatively, the clustering method may be performed for any or all entity data items. In an embodiment, user accounts, computing devices and IP addresses (and/or other entity activity data) exhibiting one or more of the above described criteria may be designated as seeds.

At blocks 242, 244, and 246, each of the determined entity data items, or seeds, may be clustered. Specifically, at block 244, any data items that are related to a particular seed are associated with a cluster that started with that seed. In an embodiment, clustering of data items may be accomplished as data bindings are executed as part of a clustering strategy. Clustered data items may be related by, for example, sharing the same or similar properties, characteristics, and/or metadata. Examples of data items that may be clustered include, but are not limited to: financial accounts or users of financial accounts (as described above, such as a username affiliated with a bank and one or more financial accounts at a bank), computing devices (e.g. computing device identifiers (mobile or otherwise), fingerprints, etc.), IP addresses and/or the like. Other entities may also be clustered in order to assist an analyst in their investigation. For example, in some embodiments, a history of money laundering investigations for a particular entity may be clustered together with the particular related entity.

As indicated by dashed line 245, the cluster generation method may optionally repeat multiple times until, for example, the clustering strategy is completed and/or no additional related data items are found by the system. Additionally, various clusters of data items may be collapsed or merged when common data items and/or properties are determined between the various clusters. Accordingly, in an embodiment the clustering method shown in FIG. 2C may iteratively cluster related data items.

In various embodiments, the clustered data items may include various properties and characteristics, including various entity related information. Accordingly, various information related to entities (devices, financial accounts, users, and IP addresses, and the like) may be included in the data cluster.

Additional details and examples regarding clustering of related data items are given in U.S. Provisional Patent Application No. 61/919,653 (the "653 Application"), filed Dec. 20, 2013, and U.S. patent application Ser. No. 13/968, 213 (the "213 Application"), filed Aug. 15, 2013, both of which are incorporated by reference herein in their entirety and for all purposes.

Figure 3C:
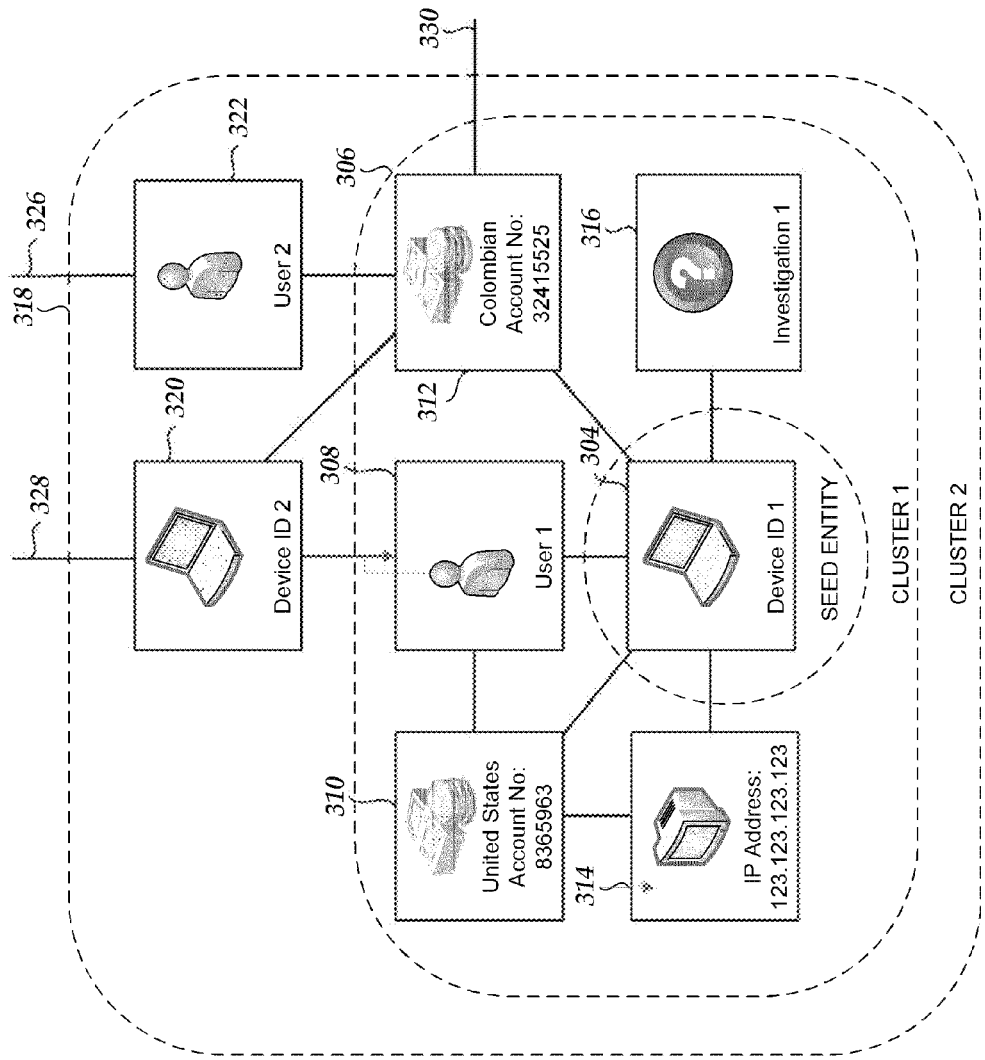
FIG. 3C illustrates an example of related money laundering entities and/or growth of a cluster of related money laundering entities, according to an embodiment of the present disclosure.

In an embodiment, a cluster graph may be generated and/or made available to an analyst or other user of the data analysis system. For example, an analyst may select a button (for example, an "Investigate in Graph" button) in a user interface of the system to view a cluster graph of a selected cluster. FIG. 3C illustrates an example of related money laundering entity data and/or growth of a cluster of related money laundering entity data in the form of a cluster graph, according to an embodiment of the present disclosure. In FIG. 3C, boxes indicate data items, while lines between boxes indicate links that connect data items. In the example of FIG. 3C, a seed computing device 304 (which may be a device ID, fingerprint, group of characteristics sufficient to identify a device, etc.) has been generated (such as by the process of FIG. 2A-2B). Then, in a clustering step corresponding to block 244 (of FIG. 2C) and represented by the inner cluster dashed line 306, various related data items 308, 310, 312, 314, and 316 are added to the cluster. Additionally, in a subsequent clustering step represented by the outer cluster dashed line 318, various additional data items 320 and 322 that are related to previously clustered data items are added to the cluster. In subsequent clustering steps additional data items may be added to the cluster as indicated by the line 326, 328, and 330.

Returning again to FIG. 2C, at block 246, if all the entities for clustering are not yet processed, the method continues back to block 242 to process additional entities. However, if all entities have been processed, the method optionally continues to FIG. 2D. At this point, each of the entities for clustering has been processed, and the system has determined, for each of the seed entity data items, a cluster of related data items.

Figure 2D:
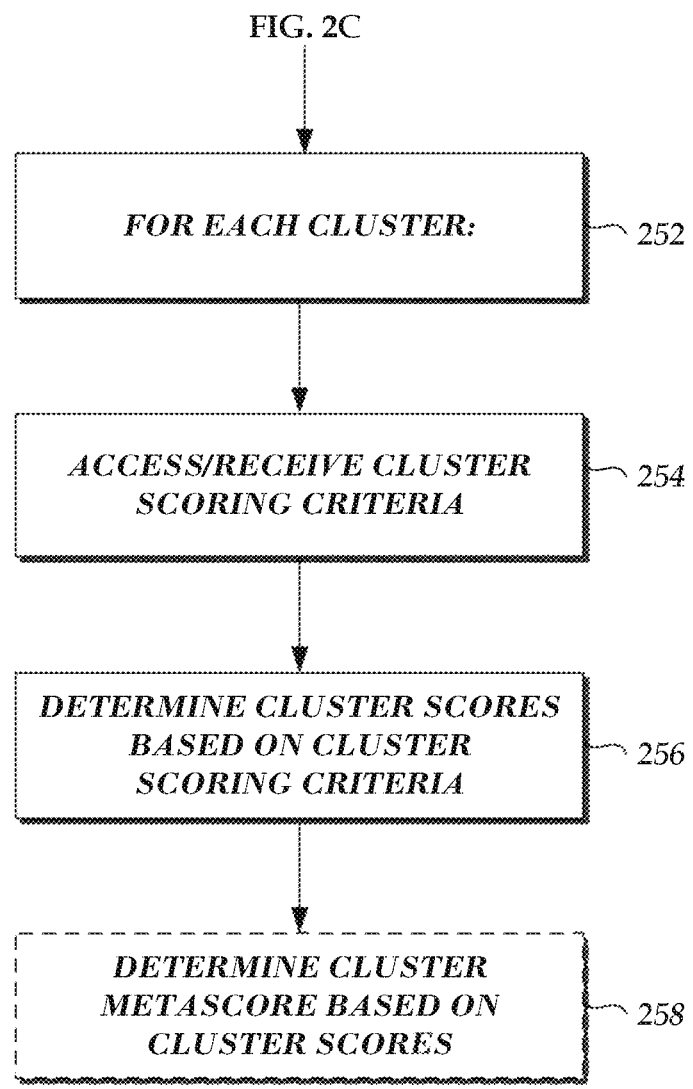
FIG. 2D is a flowchart of an example of a cluster scoring method of the data analysis system, according to various embodiments of the present disclosure.

FIG. 2D is a flowchart of an example of a cluster scoring method of the data analysis system, according to various embodiments of the present disclosure. The flowchart of FIG. 2D may correspond to block 180 of the flowchart of FIG. 1B. As described above, the clustering method shown in FIG. 2D is optional. In general, each of the generated clusters may be scored in a manner similar to the scoring of the entities described above in reference to FIG. 2B. In the flowchart of FIG. 2D, block 252 indicates that each of the following blocks (254, 256, and 258) may be performed for each of the clusters generated by the cluster generation method of FIG. 2C.

At block 254, the data analysis system may access and/or receive cluster scoring criteria. The cluster scoring criteria, as with the money laundering scoring criteria discussed above, may include any number of rules or scoring strategies such that multiple scores may be generated for each cluster. Cluster scoring criteria may include any of the money laundering scoring criteria discussed above, may include any of the money laundering indicators described above, and/or may include any other scoring criteria and/or strategies described herein.

At block 256, the cluster scoring criteria may be applied to the clusters and cluster scores may be determined. In an embodiment, each cluster score may include a raw value and/or a weighted value as described above in reference to FIG. 2B. Additionally, as described above, the system may normalize the raw values of each of the scores before applying a relative weighting to arrive at a weighted value.

At optional block 258, a metascore may be generated for the clusters. The cluster metascore may be based on a combination or aggregation of the individual scores generated in block 256. Alternatively, the metascores may be separately determined scores. In an embodiment, a metascore may be calculated by summing, multiplying, and/or otherwise aggregating or averaging the various individual scores together. The metascore may, in an embodiment, capture the relative importance of each of the individual cluster scores by weighting each of the individual scores in a manner similar to that described above with reference to FIG. 2B.

In various embodiments, cluster metascores and/or scores may advantageously enable an analyst to directly compare and/or prioritize various clusters, and/or may advantageously be used by the data analysis system to prioritize a list of clusters and/or scores related to a cluster.

Additional details and examples regarding scoring of clusters of related data items are given in the '653 Application, which is incorporated by reference herein in its entirety and for all purposes.

c. Example User Interface of the Data Analysis System

Figure 4:
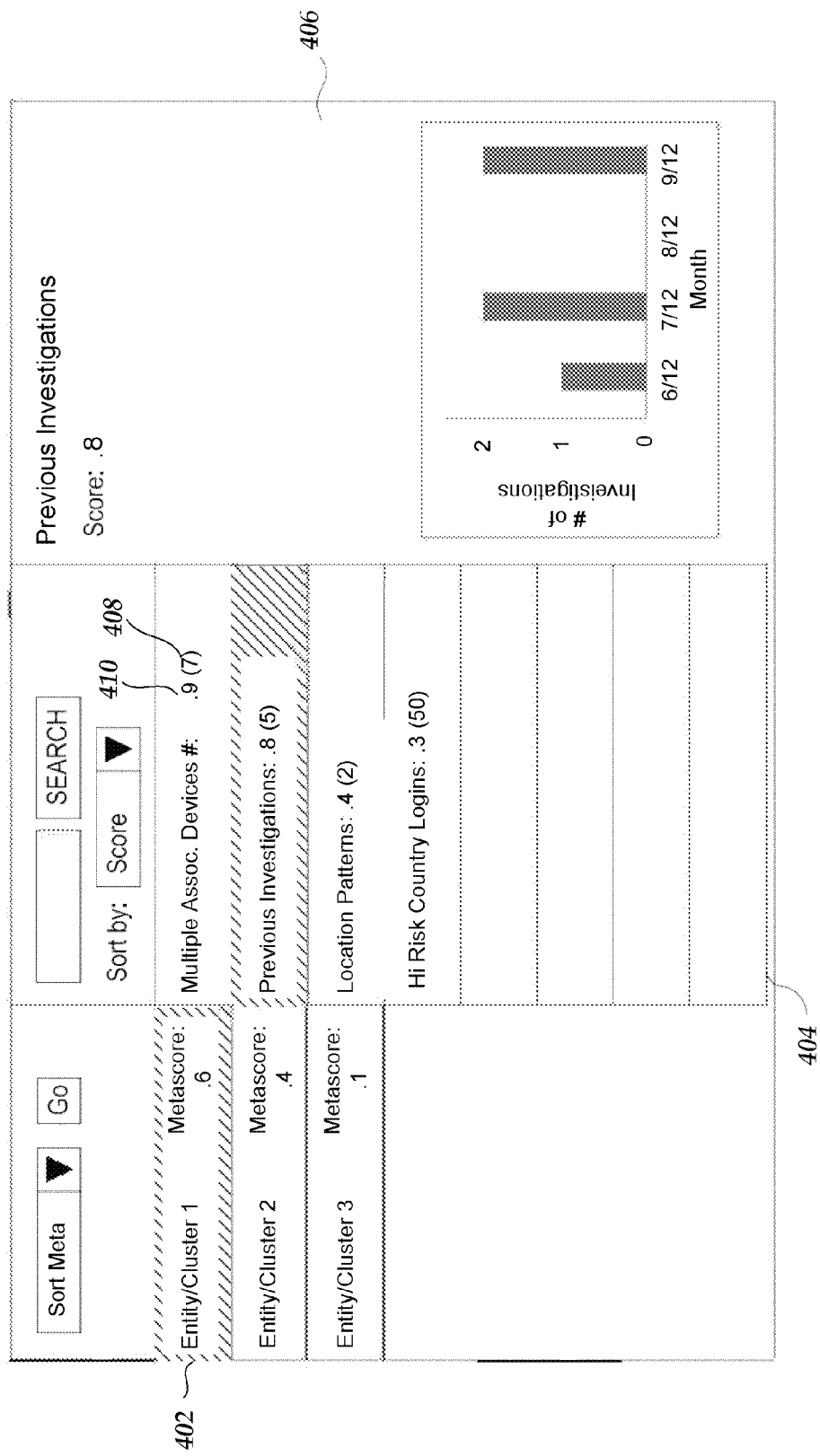
FIG. 4 illustrates an example money laundering data analysis user interface of the data analysis system, according to an embodiment of the present disclosure.

FIG. 4 illustrates an example money laundering data analysis user interface of the data analysis system, according to an embodiment of the present disclosure. In various embodiments, the example user interface may be used individually for entities and clusters, and/or entities and clusters may both be displayed in the user interface. In either case, the principles described below apply. The example user interface of FIG. 4 includes a list of entities (e.g. computing devices, bank accounts, user accounts, IP addresses, etc.) or clusters 402, a list of scores 404, and a detailed view of a score 406. In various embodiments, more or fewer elements may be included in the user interface, and/or the elements may be arranged differently. As shown, the user interface of the FIG. 4 may include a list of entities/clusters in a first column, a list of scores associated with a selected entities/cluster in a middle column, and/or details associated with a selected score in a last column. Such an arrangement may advantageously enable an analyst to investigate various scores associated with an entity/cluster. Additionally, entities/clusters in such an interface may advantageously be prioritized according to any of multiple scores and/or metascores, as described above.

In the example user interface of FIG. 4, an analyst or user has selected "Entity 1" or Cluster 1." Accordingly, various scores associated with that entity/cluster may be displayed in the list of scores 404. For example, scores are listed for "Location Patterns" (an indicator representing the number of matched patterns of physical location movements of the entity) and "Hi Risk Country Logins" (an indicator representing the number of logins to financial accounts from high risk countries) involving the entity/cluster, among others. Additionally, in the example user interface, the analyst has selected the "Previous Investigations" score. Accordingly, details related to that score may be displayed in the detailed view 406.

According to an embodiment, various items of information may be included in the user interface that may be useful to an analyst in evaluating and/or investigating the analyzed entities/generated clusters. For example, metascores associated with each of the entities/clusters may be shown in the list of entities/clusters 402, and/or the entities/clusters may be prioritized according to the metascores. In another example, raw values (408) and/or weighted values (410) may be displayed in the list of scores 404 for each score. In the example shown, a metascore of "0.6" may be calculated for "Entity/Cluster 1" by, for example, averaging the various cluster scores (for example, (0.9+0.8+0.4+0.3)/4=0.6). In another example, the detailed view 406 may include a graph that shows additional information related to the selected score. For example, in FIG. 4, the graph shown in the detailed view 406 shows a distribution of the number of investigations into the entity/cluster by month. In other embodiments, various other detailed information may be included in the user interface of FIG. 4.

In an embodiment, the data analysis system may, based on the entity activity data received, automatically evaluate the entity data items and/or generated clusters to determine a likelihood of an entity being involved in money laundering. For example, the system may determine that an entity or cluster having a metascore below a particular threshold is likely not involved in money laundering, while a cluster having a metascore above another particular threshold likely is somehow involved in money laundering. In an embodiment, the system may determine that an entity/cluster having a metascore within a particular range of thresholds requires additional analysis by an analyst as the likelihood of money laundering is not conclusive. In an embodiment, an analyst may adjust the thresholds, the metadata calculations, and/or the weighting applied to the scores. Further, the analyst may mark various entities/clusters as, for example, involved in money laundering, likely involved in money laundering, likely not involved in money laundering, and/or not involved in money laundering. Additionally, the analyst may dispatch other analysts to review particular entities/clusters and/or mark particular entities/clusters for further analysis.

In various embodiments, other aspects and/or advantage of the data analysis system may include: integration with structured data sources (for example, transactions, online access logs/web logs, mobile app information/data collected, account and customer details) that may be extremely large (for example, having millions, tens of millions, or billions of rows of data/data items)); analysis of such extremely large data sources (for example, millions, tens of millions, or billions of entity data items (for example, financial accounts, financial account users, devices and IP addresses accessing financial accounts, and related transactions) may be analyzed by the data analysis system in a short period of time (for example, on the order of seconds or minutes)); real-time analysis of such extremely large data sources; return of search results, entity scores/rankings, clusters, and/or the like on the order of seconds; automatic analysis or processing of entity data items (for example, on a schedule or in response to new data items being pushed to the system by a data source); mapping of data and scores to objects and links for the analyst without the analyst requiring any technical/SQL knowledge; enabling analysts to discover non-obvious and/or previously unknown links between various items of entity data; export functionality (for example, to CSV, PPT, PDF, and DOC formats) that allows users/analysts to collaborate with one-another as well as with external parties.

d. Example Implementation Mechanisms/Systems

Figure 5:
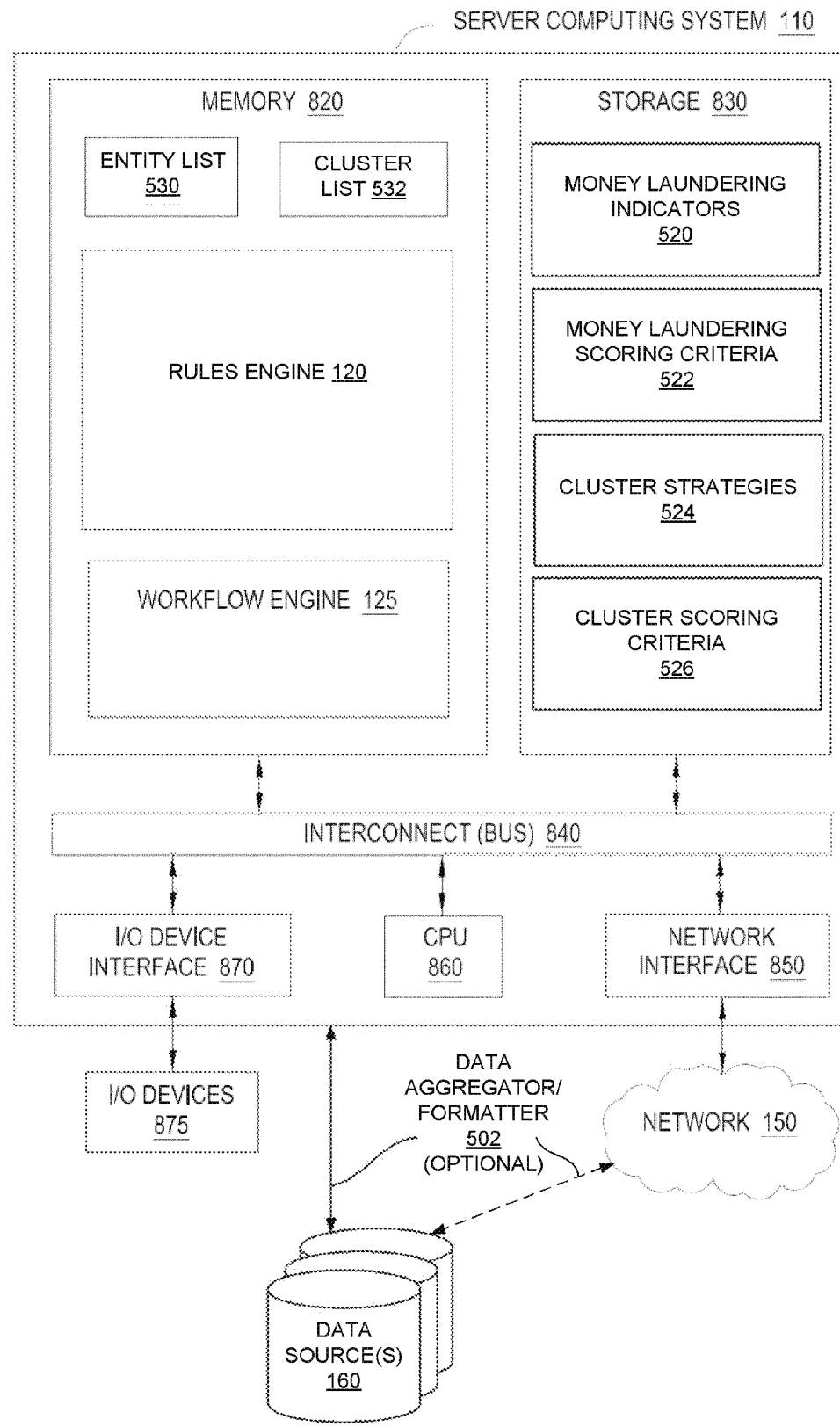
FIG. 5 illustrates components of an illustrative server computing system, according to an embodiment of the present disclosure.

FIG. 5 illustrates components of an illustrative server computing system 110, according to an embodiment. As described above in reference to FIG. 1, the server computing system 110 may comprise one or more computing devices that may perform a variety of tasks to implement the various operations of the data analysis system. As shown, the server computing system 110 may include, one or more central processing unit (CPU) 860, a network interface 850, a memory 820, and a storage 830 (for example, data store 140 of FIG. 1), each connected to an interconnect (bus) 840. The server computing system 110 may also include an I/O device interface 870 connecting I/O devices 875 (for example, keyboard, display, mouse, and/or other input/output devices) to the computing system 110. Further, in context of this disclosure, the computing elements shown in server computing system 110 may correspond to a physical computing system (for example, a system in a data center, a computer server, a desktop computer, a laptop computer, and/or the like) and/or may be a virtual computing instance executing within a hosted computing environment.

The CPU 860 may retrieve and execute programming instructions stored in memory 820, as well as store and retrieve application data residing in memory 820. The bus 840 may be used to transmit programming instructions and application data between the CPU 860, I/O device interface 870, storage 830, network interface 850, and memory 820. Note that the CPU 860 is included to be representative of, for example, a single CPU, multiple CPUs, a single CPU having multiple processing cores, a CPU with an associate memory management unit, and the like.

The memory 820 is included to be representative of, for example, a random access memory (RAM), cache and/or other dynamic storage devices for storing information and instructions to be executed by CPU 860. Memory 820 also may be used for storing temporary variables or other intermediate information during execution of instructions to be executed by CPU 860. Such instructions, when stored in storage media accessible to CPU 860, render server computing system 110 into a special-purpose machine that is customized to perform the operations specified in the instructions.

The storage 830 may be a disk drive storage device, a read only memory (ROM), or other static, non-transitory, and/or computer-readable storage device or medium coupled to bus 840 for storing static information and instructions for CPU 860. Although shown as a single unit, the storage 830 may be a combination of fixed and/or removable storage devices, such as fixed disc drives, removable memory cards, and/or optical storage, network attached storage (NAS), and/or a storage area-network (SAN).

Programming instructions, such as the rules engine 120 and/or the workflow engine 125, may be stored in the memory 820 and/or storage 830 in various software modules. The modules may be stored in a mass storage device (such as storage 830) as executable software codes that are executed by the server computing system 110. These and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

According to an embodiment, the storage 830 may include various money laundering indicators 520, various money laundering scoring criteria 522, various cluster strategies 524, various cluster scoring criteria 526, and/or the like. As described above, the money laundering indicators 520 may be used in determining a likelihood that an entity data item is involved in money laundering, the money laundering scoring criteria 522 may be used in scoring entity data items, the cluster strategies 524 may be used in generating clusters of related data items, and the cluster scoring criteria 526 may be used in scoring clusters.

Further, according to an embodiment, the memory 820 stores an entity list 530, a cluster list 532, the rules engine 120, and the workflow engine 125 (as described with reference to the various figures above). The rules engine 120 may execute the money laundering indicators 520, the money laundering criteria 522, the cluster strategies 524, the cluster scoring criteria 526, and/or the like, as described above in references to the various figure. The entity list 530 may be, for example, a list of computing devices, financial accounts, and/or IP addresses to which the money laundering indicators and/or money laundering scoring criteria are applied. The entity list 520 may further be accessed by the workflow engine 125 for presentation in a ranked order to a user via a user interface. Similarly, the cluster list 532 may be, for example, a list of cluster of related data items determined by the system based on various cluster strategies and to which the cluster scoring criteria are applied.

Although shown in memory 820, the entity list 530, rules engine 120, cluster list 532, and/or workflow engine 125 may be stored in memory 820, storage 830, and/or split between memory 820 and storage 830. Likewise, the various money laundering indicators 520, money laundering scoring criteria 522, cluster strategies 524, and/or cluster scoring criteria 526 may be stored in memory 820, storage 830, and/or split between memory 820 and storage 830.

The network 150 may be any wired network, wireless network, or combination thereof. In addition, the network 150 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

As described above in reference to FIG. 1, the server computing system 110 may be in communication with one or more data sources 160. Communication between the server computing system 110 and the data sources 160 may be via the network 150 and/or direct, as shown by the solid and dashed lines. In an embodiment, an optional data aggregator/formatter device and/or system 502 may aggregate various data from multiple data sources and/or may format the data such that it may be received by the server computing system 110 in a standardized and/or readable format. For example, when multiple data sources contain and/or provide data in various formats, the data aggregator/formatter may convert all the data into a similar format. Accordingly, in an embodiment the system may receive and/or access money laundering entity data from, or via, a device or system such as the data aggregator/formatter 502.

As also described above, in various embodiments the system may be accessible by an analyst (or other operator or user) through a web-based viewer, such as a web browser. In this embodiment, the user interface may be generated by the server computing system 110 and transmitted to the web browser of the analyst. Alternatively, data necessary for generating the user interface may be provided by the server computing system 110 to the browser, where the user interface may be generated. The analyst/user may then interact with the user interface through the web-browser. In an embodiment, the user interface of the data analysis system may be accessible through a dedicated software application. In an embodiment, the client computing device 130 may be a mobile computing device, and the user interface of the data analysis system may be accessible through such a mobile computing device (for example, a smartphone and/or tablet). In this embodiment, the server computing system 110 may generate and transmit a user interface to the mobile computing device. Alternatively, the mobile computing device may include modules for generating the user interface, and the server computing system 110 may provide user interaction data to the mobile computing device. In an embodiment, the server computing system 110 comprises a mobile computing device. Additionally, in various embodiments any of the components and/or functionality described above with reference to the server computing system 110 (including, for example, memory, storage, CPU, network interface, I/O device interface, and the like), and/or similar or corresponding components and/or functionality, may be included in the client computing device 130.

According to various embodiments, the data analysis system and various methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing devices of the data analysis system may generally be controlled and/or coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

In general, the word "module," as used herein, refers to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware devices (such as processors and CPUs) may be comprised of connected logic units, such as gates and flip-flops, and/or may be comprised of programmable units, such as programmable gate arrays or processors. The modules or computing device functionality described herein are preferably implemented as software modules, but may be represented in hardware devices. Generally, the modules described herein refer to software modules that may be combined with other modules or divided into sub-modules despite their physical organization or storage.

Server computing system 110 may implement various techniques and methods described herein using customized hard-wired logic, one or more ASICs or FPGAs, firmware and/or program logic which, in combination with various software modules, causes the server computing system 110 to be a special-purpose machine. According to one embodiment, the techniques herein are performed by server computing system 110 in response to CPU 860 executing one or more sequences of one or more modules and/or instructions contained in memory 820. Such instructions may be read into memory 820 from another storage medium, such as storage 830. Execution of the sequences of instructions contained in memory 820 may cause CPU 840 to perform the processes and methods described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage 830. Volatile media includes dynamic memory, such as memory 820. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 840. Transmission media may also take the form of acoustic or light waves, such as those generated during radio-wave and infra-red data communications.

Various forms of media may be involved in carrying one or more sequences of one or more instructions to CPU 860 for execution. For example, the instructions may initially be carried on a magnetic disk or solid state drive of a remote computer. The remote computer may load the instructions and/or modules into its dynamic memory and send the instructions over a telephone or cable line using a modem. A modem local to server computing system 820 may receive the data on the telephone/cable line and use a converter device including the appropriate circuitry to place the data on bus 840. Bus 840 carries the data to memory 820, from which CPU 860 retrieves and executes the instructions. The instructions received by memory 820 may optionally be stored on storage 830 either before or after execution by CPU 860.

V. Additional Embodiments

While the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system to assist a human analyst in analyzing large amounts of money laundering related data, the computer system comprising:
   one or more computer readable storage devices configured to store:
      one or more software modules including computer executable instructions, the one or more software modules including a rules engine module and a workflow engine module;
      a plurality of entity data items;
      a plurality of Internet Protocol address data items;
      a plurality of entity activity data items, the entity activity data items each associated with:
         a user, an Internet Protocol address, an investigation, or one or more respective financial accounts, and at least one entity data item of the plurality of entity data items;
      a plurality of money laundering indicators;
      a clustering strategy; and
      a plurality of money laundering scoring criteria; and
   one or more hardware computer processors in communication with the one or more computer readable storage devices and configured to execute the computer executable instructions of the one or more software modules in order to cause the computer system to:
      designate, by the rules engine module, one or more seeds by:
         accessing, from the one or more computer readable storage devices, the plurality of entity data items, the plurality of Internet Protocol address data items, and the plurality of the entity activity data items;
         determining a first Internet Protocol address from the plurality of Internet Protocol address data items associated with a first entity data item of the plurality of entity data items, wherein a computing device associated with the first entity data item was assigned the first Internet Protocol address;
         comparing the plurality of money laundering indicators to the plurality of entity activity data items associated with the first entity data item to determine whether the first entity data item satisfies money laundering indicators that include:
            determining that the first Internet Protocol address corresponds to a first geographic area within predetermined first high-risk geographic areas for money laundering;
            determining that the plurality of entity activity data items includes a first entity activity data item where the first Internet Protocol address was used to access a first financial account;
            determining a first amount associated with the first financial account;
            determining a transaction amount associated with the first financial account; and
            determining that the transaction amount relative to the first amount corresponds to a predetermined percentage, wherein the predetermine percentage corresponds to a remaining amount that is indicative of a potential money laundering fee; and
         designating the first entity data item as a seed;
      for the designated first entity data item seed:
         identify, by the rules engine module, one or more entity activity data items determined to be associated with the designated first entity data item seed based at least on the clustering strategy, wherein the clustering strategy queries the one or more computer readable storage devices to determine at least one of:
            one or more users associated with the designated first entity data item seed,
            one or more Internet Protocol addresses associated with the designated first entity data item seed,
            one or more financial accounts associated with the designated first entity data item seed, or
            one or more investigations associated with the designated first entity data item seed;
         generate, by the rules engine module, a cluster based at least on the designated first entity data item seed, wherein generating the cluster comprises:

adding the designated first entity data item seed to the cluster;
adding the one or more entity activity data items to the cluster;
identifying an additional one or more entity activity data items associated with any data item of the cluster;
adding the additional one or more entity activity data items to the cluster; and
storing the generated cluster in the one or more computer readable storage devices;
score the cluster by:
determining raw score values for each of the satisfied money laundering indicators associated with the first entity data item; and
based on at least one of the plurality of money laundering scoring criteria, determining a score for the first entity data item based at least on the determined raw score values of the satisfied money laundering indicators and a quantity of satisfied money laundering indicators, wherein the determined score is indicative of a likelihood that the first entity data item is associated with money laundering; and
cause presentation, by the workflow engine module, of the cluster and the score for the first entity data item in a user interface of a client computing device.

2. The computer system of claim 1, wherein determining whether the first entity data item satisfies money laundering indicators further includes:
determining that the plurality of entity activity data items further includes a second entity activity data item where a second Internet Protocol address was used to access the first financial account, wherein the second Internet Protocol address corresponds to a second geographic area within predetermined second high-risk geographic areas for money laundering, and wherein the first and second high-risk geographic areas correspond to a potential money laundering route.

3. The computer system of claim 1, wherein the plurality of money laundering indicators comprises a second money laundering indicator configured to determine a configuration change of a computing device indicative of a change in respective geographic areas of the computing device that is associated with a potential pattern of money laundering.

4. The computer system of claim 1, wherein at least one money laundering indicator of the plurality of money laundering indicators comprises one or more rules configured to determine whether a first entity, uniquely associated with the first entity data item in the plurality of entity data items, accessed a financial account from one or more locations associated with illegal activity.

5. The computer system of claim 4, wherein the one or more locations associated with illegal activity comprises a plurality of distinct locations, and the at least one money laundering indicator requires that the first entity, uniquely associated with the first entity data item, accessed the financial account from at least two distinct locations in the plurality of distinct locations.

6. The computer system of claim 5, wherein the at least one money laundering indicator requires that the first entity accessed the financial account from at least three distinct locations in the plurality of distinct locations in a specific order or pattern.

7. The computer system of claim 6, wherein the specific order or pattern comprises a timing requirement for the first entity accessing the financial account from the at least three distinct locations in the plurality of distinct locations.

8. The computer system of claim 6, wherein at least one money laundering scoring criteria is configured to determine a score for an entity based on whether the first entity accessed the financial account from locations that are within a threshold range of a registered address associated with the entity.

9. A computer-implemented method to assist a human analyst in analyzing large amounts of money laundering related data, the computer-implemented method comprising:
under control of one or more hardware computing devices configured with specific computer executable instructions,
enabling communication with one or more computer readable storage devices configured to store:
one or more software modules including computer executable instructions, the one or more software modules including a rules engine module and a workflow engine module;
a plurality of entity data items;
a plurality of Internet Protocol address data items;
a plurality of entity activity data items, the entity activity data items each associated with:
a user, an Internet Protocol address, an investigation, or one or more respective financial accounts, and
at least one entity data item in the plurality of entity data items;
a plurality of money laundering indicators;
a clustering strategy; and
a plurality of money laundering scoring criteria;
designating, by the rules engine module, one or more seeds by:
accessing, from the one or more computer readable storage devices, the plurality of entity data items, the plurality of Internet Protocol address data items, and the plurality of the entity activity data items;
determining a first Internet Protocol address from the plurality of Internet Protocol address data items associated with a first entity data item of the plurality of entity data items, wherein a computing device associated with the first entity data item was assigned the first Internet Protocol address;
comparing the plurality of money laundering indicators to the plurality of entity activity data items associated with the first entity data item to determine whether the first entity data item satisfies money laundering indicators that include:
determining that the first Internet Protocol address corresponds to a first geographic area within predetermined first high-risk geographic areas for money laundering;
determining that the plurality of entity activity data items includes a first entity activity data item where the first Internet Protocol address was used to access a first financial account;
determining a first amount associated with the first financial account;
determining a transaction amount associated with the first financial account; and
determining that the transaction amount relative to the first amount corresponds to a predetermined percentage, wherein the predetermine percentage corresponds to a remaining amount that is indicative of a potential money laundering fee; and designating the first entity data item as a seed;

for the designated first entity data item seed:
identifying, by the rules engine module, one or more entity activity data items determined to be associated with the designated first entity data item seed based at least on the clustering strategy, wherein the clustering strategy queries the one or more computer readable storage devices to determine at least one of: one or more users associated with the designated first entity data item seed, one or more Internet Protocol addresses associated with the designated first entity data item seed, one or more financial accounts associated with the designated first entity data item seed, or one or more investigations associated with the designated first entity data item seed;

generating, by the rules engine module, a cluster based at least on the designated first entity data item seed, wherein generating the cluster comprises:
adding the designated first entity data item seed to the cluster;
adding the one or more entity activity data items to the cluster;
identifying an additional one or more entity activity data items associated with any data item of the cluster;
adding the additional one or more entity activity data items to the cluster; and
storing the generated cluster in the one or more computer readable storage devices;

score the cluster by:
determining raw score values for each of the satisfied money laundering indicators associated with the first entity data item; and
based on at least one of the plurality of money laundering scoring criteria, determining a score for the first entity data item based at least on a quantity of satisfied money laundering indicators; and causing presentation, by the workflow engine module, of the cluster and the score for the first entity data item in a user interface of a client computing device.

10. The computer-implemented method of claim 9, wherein determining whether the first entity data item satisfies money laundering indicators further includes:
determining that the plurality of entity activity data items further includes a second entity activity data item where a second Internet Protocol address was used to access the first financial account, wherein the second Internet Protocol address corresponds to a second geographic area within predetermined second high-risk geographic areas for money laundering, and wherein the first and second high-risk geographic areas correspond to a potential money laundering route.

11. The computer-implemented method of claim 9, wherein determining whether the first entity data item satisfies money laundering indicators further includes determining that a transaction associated with the transaction amount includes a change in currency.

12. The computer-implemented method of claim 9, wherein at least one money laundering indicator of the plurality of money laundering indicators comprises one or more rules configured to determine whether a first entity, uniquely associated with the first entity data item in the plurality of entity data items, accessed a financial account from one or more locations associated with illegal activity.

13. The computer-implemented method of claim 12, wherein the one or more locations associated with illegal activity comprises a plurality of distinct locations, and the at least one money laundering indicator requires that the first entity, uniquely associated with the first entity data item, accessed the financial account from at least two distinct locations in the plurality of distinct locations.

14. The computer-implemented method of claim 13, wherein the at least one money laundering indicator requires that the first entity accessed the financial account from at least three distinct locations in the plurality of distinct locations in a specific order or pattern.

15. The computer-implemented method of claim 14, wherein the specific order or pattern comprises a timing requirement for the first entity accessing the financial account from the at least three distinct locations in the plurality of distinct locations.

16. The computer-implemented method of claim 14, wherein at least one money laundering scoring criteria is configured to determine a score for an entity based on at least one access location of the financial account by the first entity.

17. A non-transitory computer-readable storage medium storing computer-executable instructions that, when executed by a computer system, configure the computer system to perform operations comprising:
enabling communication with one or more computer readable storage devices configured to store:
one or more software modules including computer executable instructions, the one or more software modules including a rules engine module and a workflow engine module;
a plurality of entity data items;
a plurality of Internet Protocol address data items;
a plurality of entity activity data items, the entity activity data items each associated with:
a user, an Internet Protocol address, an investigation, or one or more respective financial accounts, and
at least one entity data item in the plurality of entity data items;
a plurality of money laundering indicators;
a clustering strategy; and
a plurality of money laundering scoring criteria;
designating, by the rules engine module, one or more seeds by:
accessing, from the one or more computer readable storage devices, the plurality of entity data items, the plurality of Internet Protocol address data items, and the plurality of the entity activity data items;
determining a first Internet Protocol address from the plurality of Internet Protocol address data items associated with a first entity data item of the plurality of entity data items, wherein a computing device associated with the first entity data item was assigned the first Internet Protocol address;
comparing the plurality of money laundering indicators to the plurality of entity activity data items associated with the first entity data item to determine whether the first entity data item satisfies money laundering indicators that include:
determining that the first Internet Protocol address corresponds to a first geographic area within predetermined first high-risk geographic areas for money laundering;

determining that the plurality of entity activity data items includes a first entity activity data item where the first Internet Protocol address was used to access a first financial account;

determining a first amount associated with the first financial account;

determining a transaction amount associated with the first financial account; and determining that the transaction amount relative to the first amount corresponds to a predetermined percentage, wherein the predetermine percentage corresponds to a remaining amount that is indicative of a potential money laundering fee; and for the designated first entity data item seed:

identifying, by the rules engine module, one or more entity activity data items determined to be associated with the designated first entity data item seed based at least on the clustering strategy, wherein the clustering strategy queries the one or more computer readable storage devices to determine at least one of: one or more users associated with the designated first entity data item seed, one or more Internet Protocol addresses associated with the designated first entity data item seed, one or more financial accounts associated with the designated first entity data item seed, or one or more investigations associated with the designated first entity data item seed;

generating, by the rules engine module, a cluster based at least on the designated first entity data item seed, wherein generating the cluster comprises:

adding the designated first entity data item seed to the cluster;

adding the one or more entity activity data items to the cluster;

identifying an additional one or more entity activity data items associated with any data item of the cluster;

adding the additional one or more entity activity data items to the cluster; and storing the generated cluster in the one or more computer readable storage devices;

score the cluster by:

determining raw score values for each of the satisfied money laundering indicators associated with the first entity data item; and based on at least one of the plurality of money laundering scoring criteria, determining a score for the first entity data item; and causing presentation, by the workflow engine module, of the cluster and the score for the first entity data item in a user interface of a client computing device.

18. The non-transitory computer-readable storage medium of claim 17, wherein determining whether the first entity data item satisfies money laundering indicators further includes:

determining that the plurality of entity activity data items further includes a second entity activity data item where a second Internet Protocol address was used to access the first financial account, wherein the second Internet Protocol address corresponds to a second geographic area within predetermined second high-risk geographic areas for money laundering, and wherein the first and second high-risk geographic areas correspond to a potential money laundering route.

19. The non-transitory computer-readable storage medium of claim 17, wherein determining whether the first entity data item satisfies money laundering indicators further includes:

determining a first user accessed the first financial account; and determining that the first user is affiliated with a predetermined user watch list.

20. The non-transitory computer-readable storage medium of claim 17, wherein at least one money laundering indicator of the plurality of money laundering indicators comprises one or more rules configured to determine whether a first entity, uniquely associated with the first entity data item in the plurality of entity data items, accessed a financial account from one or more locations associated with illegal activity.

* * * * *